United States Patent
Zhang et al.

(10) Patent No.: US 11,410,586 B2
(45) Date of Patent: Aug. 9, 2022

(54) ARRAY SUBSTRATE AND MANUFACTURING METHOD THEREOF, DISPLAY DEVICE AND DRIVING METHOD THEREOF AND MANUFACTURING METHOD OF DISPLAY SUBSTRATE

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Donghui Zhang, Beijing (CN); Xiaoye Ma, Beijing (CN); Guodong Liu, Beijing (CN); Xiaofang Gu, Beijing (CN); Ruifang Du, Beijing (CN); Huan Ni, Beijing (CN); Zhenyu Han, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 413 days.

(21) Appl. No.: 16/487,828

(22) PCT Filed: Mar. 19, 2019

(86) PCT No.: PCT/CN2019/078663
§ 371 (c)(1),
(2) Date: Aug. 21, 2019

(87) PCT Pub. No.: WO2020/062798
PCT Pub. Date: Apr. 2, 2020

(65) Prior Publication Data
US 2021/0407354 A1    Dec. 30, 2021

(30) Foreign Application Priority Data

Sep. 28, 2018    (CN) .................. 201811141052.5

(51) Int. Cl.
*G09G 5/02*  (2006.01)
*G09G 3/20*  (2006.01)
(Continued)

(52) U.S. Cl.
CPC .......... *G09G 3/20* (2013.01); *G02F 1/13439* (2013.01); *G02F 1/133514* (2013.01);
(Continued)

(58) Field of Classification Search
USPC ............ 345/694, 419, 695, 696; 349/43, 44; 257/72
See application file for complete search history.

(56) References Cited

U.S. PATENT DOCUMENTS

2002/0021396 A1    2/2002   Yoo et al.
2011/0122329 A1    5/2011   Broughton et al.
(Continued)

FOREIGN PATENT DOCUMENTS

CN    101556412 A    10/2009
CN    102608792 A    7/2012
(Continued)

OTHER PUBLICATIONS

International Search Report in Application No. PCT/CN2019/078663, dated May 29, 2019.
(Continued)

*Primary Examiner* — Thuy N Pardo
(74) *Attorney, Agent, or Firm* — Syncoda LLC; Feng Ma

(57) ABSTRACT

A display device and driving method thereof and a manufacturing method of a display substrate involve an array substrate and manufacturing method thereof. The array
(Continued)

substrate includes: a base substrate; and a number of display sub-pixels arranged in a matrix on the base substrate. Each individual display sub-pixel includes: a pixel electrode; a first common electrode; and a second common electrode; wherein the first common electrode and the second common electrode are insulated from each other; and wherein the pixel electrode is configured to interact respectively with the first common electrode and the second common electrode so as to conduct one or more display operations.

15 Claims, 13 Drawing Sheets

(51) Int. Cl.
*H04N 13/356* (2018.01)
*G02F 1/1343* (2006.01)
*G02F 1/1335* (2006.01)
*G09G 3/00* (2006.01)
*H04N 13/302* (2018.01)
*H04N 13/31* (2018.01)
*G02B 30/30* (2020.01)

(52) U.S. Cl.
CPC .. *G02F 1/133526* (2013.01); *G02F 1/134345* (2021.01); *G09G 3/003* (2013.01); *H04N 13/356* (2018.05); *G02B 30/30* (2020.01); *G09G 2300/0426* (2013.01); *G09G 2300/0465* (2013.01); *H04N 13/302* (2018.05); *H04N 13/31* (2018.05)

(56) References Cited

U.S. PATENT DOCUMENTS

| | | | |
|---|---|---|---|
| 2013/0002974 A1* | 1/2013 | Minato | G02F 1/133512 349/43 |
| 2013/0106839 A1* | 5/2013 | Kim | H04N 13/356 345/419 |
| 2015/0138480 A1* | 5/2015 | Yi | G02F 1/133502 349/44 |
| 2015/0301400 A1* | 10/2015 | Kimura | G02F 1/133516 349/43 |
| 2016/0254275 A1* | 9/2016 | Feng | H01L 33/42 257/72 |
| 2016/0259460 A1* | 9/2016 | Yang | G06F 3/0445 |
| 2017/0160604 A1* | 6/2017 | Wang | G02F 1/136286 |
| 2017/0219836 A1* | 8/2017 | Hyodo | G02F 1/29 |
| 2017/0230642 A1* | 8/2017 | Suzuki | H04N 13/324 |
| 2017/0263170 A1* | 9/2017 | Mu | G09G 3/3614 |

FOREIGN PATENT DOCUMENTS

| | | |
|---|---|---|
| CN | 105448197 A | 3/2016 |
| CN | 106200173 A | 12/2016 |
| CN | 106338864 A | 1/2017 |
| CN | 106773272 A | 5/2017 |
| CN | 106959557 A | 7/2017 |
| KR | 20080079017 A | 8/2008 |

OTHER PUBLICATIONS

CN First Office Action in Application No. 201811141052.5, dated Feb. 28, 2020.
CN Second Office Action in Application No. 201811141052.5, dated Oct. 29, 2020.

* cited by examiner ns/MANUFACTURING METHOD THEREOF, DISPLAY DEVICE AND DRIVING METHOD THEREOF AND MANUFACTURING METHOD OF DISPLAY SUBSTRATE

CROSS-REFERENCE TO RELATED APPLICATION

The present application claims priority to Chinese Patent Application No. 201811141052.5 filed on Sep. 28, 2018, the disclosure of which is hereby incorporated by reference in its entirety.

TECHNICAL FIELD

The present disclosure relates generally to the field of display technologies, and more specifically to an array substrate and manufacturing method thereof.

BACKGROUND

In recent years, 3D display technology has become a major development trend in display technology field. A working principle of 3D display device is: a left eye and a right eye of a person where each eye respectively receives different parallax images, e.g., a first image and a second image with a parallax between them; stereoscopic vision, e.g. with distance, depth and stereoscopic perception, is then generated in the brain based on the first image observed by the left eye, i.e. left eye image, and the second image observed by the right eye, i.e. right eye image.

SUMMARY

In a first aspect of the invention as disclosed herein, an array substrate is contemplated having: a base substrate; and a plurality of display sub-pixels arranged in a matrix on the base substrate. As illustrated herein, each individual display sub-pixel can further include: a pixel electrode; a first common electrode; and a second common electrode; wherein the first common electrode and the second common electrode can be insulated from each other; and wherein the pixel electrode can be configured to interact respectively with the first common electrode and the second common electrode so as to conduct one or more display operations.

In some embodiments one or more common voltage terminals can be provided on the base substrate between two of the plurality of display sub-pixels. In such embodiments, the first common electrode and the second common electrode can be configured to be connected to different common voltage terminals so as to receive a first common voltage and a second common voltage.

In some additional embodiments, the first common electrode and the second common electrode can be provided at a common height above the base substrate.

In some additional embodiments, the first common electrodes of at least two adjacent display sub-pixels can be electrically connected, wherein the second common electrodes of at least two adjacent display sub-pixels can also be electrically connected.

In some embodiments, the first common electrodes of at least two adjacent display sub-pixels can be connected to a common block electrode, the first common block electrode can extend in a first direction; and wherein the second common electrodes of at least two adjacent display sub-pixels are connected to a second common block electrode can also extend in the first direction parallel to the first common block electrode.

In some additional embodiments, the array substrate can further include a plurality of first common voltage lines and a plurality of second common voltage lines provided on the base substrate, the plurality of first common voltage lines and the plurality of second common voltage lines extending parallel to one another in a second direction, wherein, the first common electrodes of at least two adjacent display sub-pixels which extend in the first direction are electrically connected to a first common voltage line; and wherein the second common electrodes of at least two adjacent display sub-pixels which extend in the first direction are electrically connected to a second common voltage line, wherein the first direction and the second direction cross each other.

In some additional embodiments, the pixel electrodes, the first common electrodes and the second common electrodes can be located on the base substrate, and wherein for each sub-pixel, the orthographic projection of the pixel electrode over the base substrate and the orthographic projections of the first common electrode and the second common electrode over the base substrate are overlapped; and wherein for each sub-pixel, the first common electrode and the second common electrode are tilted with respect to the base substrate such that first common electrode and the second common electrode face one another such that the overall shape of the first common electrode and the second common electrode is a first concave shape in relation to the base substrate.

In some additional embodiments, the pixel electrodes are located between the first common electrodes and the base substrate; wherein each sub-pixel can be formed having a second concave shape in relation to the base substrate; wherein the first concave shape and the second concave shape correspond in shape one to another.

Also contemplated herein is a display device, which can include any one of the array substrates discussed herein, wherein the display device further comprises a display substrate.

In some additional embodiments, the display substrate and the array substrate can be configured parallel to one another, wherein the display substrate comprises a first substrate, wherein the first substrate can include a plurality of lenses corresponding to the one or more associated concave portions, at least one concave portion being associated with each of the display sub-pixels, wherein at least one lens can be arranged inside each of the concave portions of the display substrate.

In some additional embodiments, the first substrate can include a color film layer, the color film layer also including one or more associated concave portions, the color film layer extending into each of the concave portions of the display substrate.

Also contemplated herein is a manufacturing method of an array substrate, the method including the steps of: providing a base substrate, and forming display sub-pixels over the base substrate, wherein forming the display sub-pixels includes the steps of: forming the first common electrodes and the second common electrodes over the base substrate, wherein, the first common electrodes and the second common electrodes are insulated from each other and are configured side by side over the base substrate; and forming the pixel electrodes over the base substrate, wherein, the pixel electrodes are configured to allow them to interact respectively with the first common electrodes and the second common electrodes to conduct display operations.

In some additional embodiments, for each of the pixel electrodes, the first common electrodes and the second common electrodes over the base substrate, the orthographic projection of the pixel electrodes over the base substrate and the orthographic projections of the first common electrode and the second common electrode over the base substrate respectively overlap one another;

In some additional embodiments, in each sub-pixel, the first common electrode and the second common electrode are both tilted towards the base substrate from the side they face each other to the side they are adjacent to each other, as a result, the overall shape of the first common electrode and the second common electrode is a first concave shape in relation to the base substrate; and wherein in each sub-pixel, the pixel electrode is roughly in a second concave shape in relation to the base substrate; and wherein the first concave shape and the second concave shape correspond to one another.

Also contemplated herein is a manufacturing method of a display substrate, the method including the steps of: providing a first substrate; forming concave portions on an upper surface of the first substrate; and forming a lens material layer over the concave portions and patterning the lens material layer to form the lenses that are located inside the concave portions.

In some additional embodiments, the first substrate can include a base substrate, wherein the method further includes the steps of: forming a first dielectric layer over the surface of the base substrate; forming concave portions in the first dielectric layer.

Also contemplated herein is a driving method for utilizing of any one of the display devices contemplated herein, the driving method including the steps of: applying a pixel voltage to a pixel electrodes of a display sub-pixel; in a 2D display mode, applying same common voltage to a first common electrode and a second common electrode of a display sub-pixel; and in a 3D display mode, applying different common voltages to a first common electrode and a second common electrode of a display sub-pixel.

Also contemplated herein is display system, the display system including: an array substrate. In such embodiments, the array substrate can include: an array base substrate having an upper side and a lower side; and a plurality of display sub-pixels arranged in a matrix on the upper side of the array base substrate. In such embodiments, each individual display sub-pixel can also include: a pixel electrode arranged above the array base substrate; a first common electrode being arranged above an upper side of the pixel electrode; and a second common electrode arranged above the pixel electrode adjacent the first common electrode; wherein the first common electrode and the second common electrode are insulated from each other; and wherein the pixel electrode is configured to interact respectively with both the first common electrode and the second common electrode so as to conduct one or more display operations. In such embodiments the display system can also include: a display substrate, the display substrate including: a display base substrate having an upper side and a lower side; and a color filter layer located above the display substrate; and wherein a first image pertaining to a right eye and a second image pertaining to a left eye are both projected from the array substrate through the display substrate.

In some additional embodiments, one or more common voltage terminals can be provided on the array base substrate between one or more rows of display sub-pixels; wherein, the first common electrode and the second common electrode are configured to be connected to different common voltage terminals so as to receive a first common voltage and a second common voltage.

In some additional embodiments, the first common electrode and the second common electrode can be provided at a common height above the array base substrate.

In some additional embodiments, the array substrate can also include: a plurality of display sub-pixels arranged in a matrix being grouped into a display pixel, wherein the array substrate comprises a plurality of display pixels also being arranged in the form of an array; wherein the first common electrodes of at least two adjacent display sub-pixels are electrically connected; and wherein the second common electrodes of at least two adjacent display sub-pixels are electrically connected.

In some additional embodiments, the first common electrodes of at least two adjacent display sub-pixels can be connected to a common block electrode, the first common block electrode can extend in a first direction; and wherein the second common electrodes of at least two adjacent display sub-pixels can be connected to a second common block electrode which can also extend in the first direction parallel to the first common block electrode.

In some additional embodiments, the array substrate can also include: a plurality of first common voltage lines provided on the array base substrate; and a plurality of second common voltage lines provided on the array base substrate; wherein the plurality of first common voltage lines and the plurality of second common voltage lines extend across the array base substrate parallel to one another in a second direction; wherein the first common electrodes of at least two adjacent display sub-pixels are electrically connected to a first common voltage line; and wherein the second common electrodes of at least two adjacent display sub-pixels are electrically connected to a second common voltage line; and wherein the first direction and the second direction are perpendicular.

In some additional embodiments, the pixel electrodes, the first common electrodes and the second common electrodes can be located above the top surface of the array base substrate, and wherein for each sub-pixel, an orthographic projection of the pixel electrode over the array base substrate and a orthographic projection of each of the first common electrode and the second common electrode extend over the array base substrate in an overlapping fashion; and wherein for each sub-pixel, the first common electrode and the second common electrode are tilted with respect to the array base substrate such that first common electrode and the second common electrode face one another such that the overall shape of the first common electrode and the second common electrode is a first concave shape in relation to the array base substrate.

In some additional embodiments, the pixel electrodes can be located between the first common electrodes and the array base substrate; wherein each sub-pixel can be formed having a second concave shape in relation to the array base substrate; wherein the first concave shape and the second concave shape correspond in shape one to another.

In some additional embodiments, the display substrate can also include: a plurality of microlenses being provided on an upper surface of the color film layer, the color film layer being provide with a plurality of concave recesses configured to receive each microlens therein.

In some additional embodiments, the array substrate can also include: a first insulation layer provided between the array base substrate and the pixel electrode; and a second insulation layer provided between each pixel electrode and an associated first common electrode and an associated second common electrode for each display sub-pixel.

In some additional embodiments, the array substrate can also include: a first insulation layer provided between the array base substrate and the pixel electrode; and a second insulation layer provided between each pixel electrode and an associated first common electrode and an associated second common electrode for each display sub-pixel.

In some additional embodiments, the array substrate can also include: a plurality of data lines provided over the array base substrate between one or more columns of pixel electrodes, the plurality of data lines being encompassed by the second insulating layer.

In some additional embodiments, the array substrate can also include: a plurality of data lines provided over the array base substrate between one or more columns of pixel electrodes.

In various embodiments of the present disclosure, the electrical potential of the common electrode of the left half of a sub-pixel and the electrical potential of the right half of a sub-pixel are controlled separately, and the brightness levels of the two portions of a pixel are adjusted separately, as a result, images are formed in the viewer's left eye and right eye though separate light paths, three-dimensional effect is realized without reducing resolution.

BRIEF DESCRIPTION OF DRAWINGS

To more clearly illustrate some of the embodiments, the following is a brief description of the drawings.

The drawings in the following descriptions are only illustrative of some embodiments. For those of ordinary skill in the art, other drawings of other embodiments can become apparent based on these drawings.

DETAILED DESCRIPTION

Figure 1:
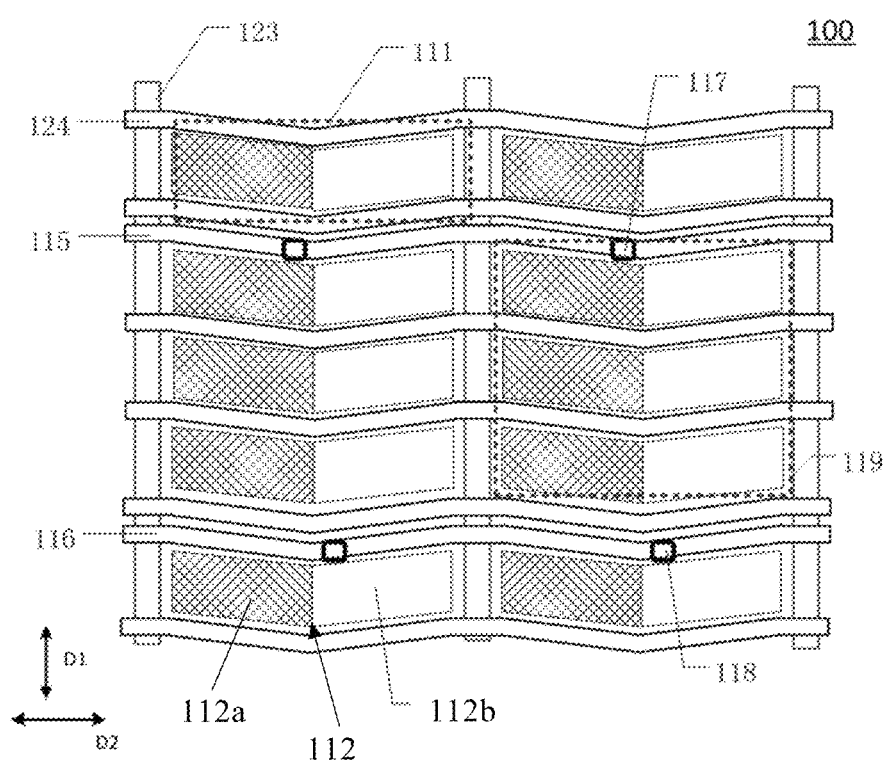
FIG. 1 is a top view of a schematic plan view of an array substrate according to some embodiments of the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. can be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or other structure is referred to as being "on" or extending "onto" another element, it can be directly on or extend directly onto the other element or intervening elements can also be present. In contrast, when an element is referred to as being "directly on" or extending "directly onto" another element, there are no intervening elements present.

Likewise, it will be understood that when an element such as a layer, region, or substrate is referred to as being "over" or extending "over" another element, it can be directly over or extend directly over the other element or intervening elements can also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

Relative terms such as "below" or "above" or "upper" or "lower" or "horizontal" or "horizontal" can be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Various embodiments of the present disclosure provide an array substrate and manufacturing method thereof, a display device and driving method thereof and a manufacturing method of a display substrate. The array substrate includes a plurality of display sub-pixels. Each display sub-pixel includes a pixel electrode, a first common electrode and a second common electrode; the first common electrode and the second common electrode are insulated from each other and are configured side by side over the array substrate; the pixel electrode is configured to interact respectively with the first common electrode and the second common electrode to conduct display operations.

The electrical potential of the common electrode of the left half-pixel and the electrical potential of the right half-pixel are controlled separately, and the brightness levels of the two portions of the pixel are adjusted separately, as a result, images are formed in the viewer's left eye and right eye through separate light paths, three-dimensional effect is achieved without reducing resolution.

Figure 12:
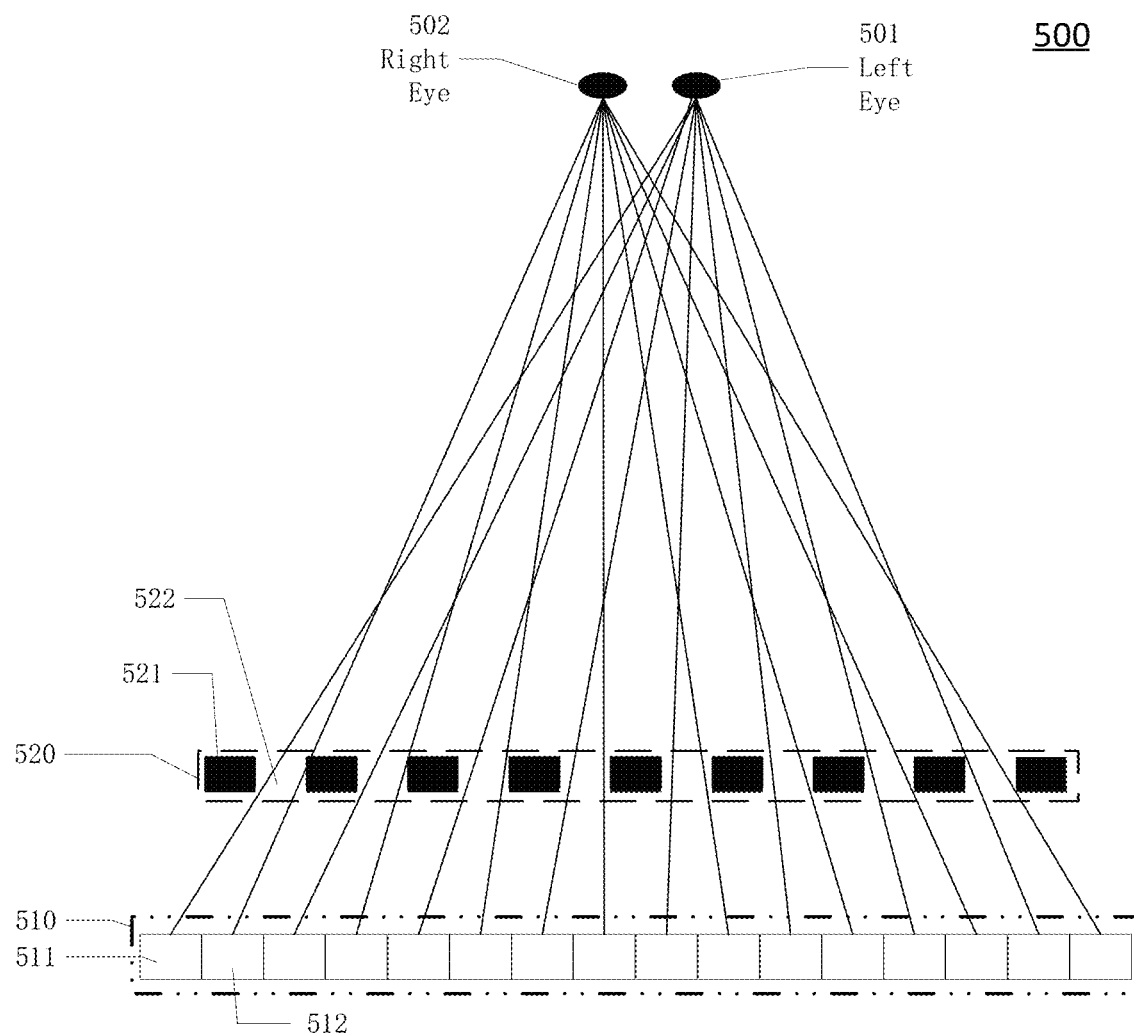
FIG. 12 is a side cross-sectional view of an alternative display device illustrative of various alternative inventive aspects of the present disclosure.

FIG. 12 illustrates a 3D display device 500. As shown in FIG. 12, the display device 500 includes a display panel 510 and a parallax grating 520. The parallax grating 520 includes light-blocking regions 521 and transparent regions 522 arranged alternately in a horizontal direction. The display panel 510 includes left eye pixels 511 and right eye pixels 512 arranged alternately in a horizontal direction to emit light corresponding to a left eye image and light corresponding to a right eye image. As shown in FIG. 12, the light emitted by the left eye pixels 511 and the right eye pixels 512 can respectively enter a left eye 501 and a right eye 502 of a user. In will then be understood that light emitted from the left eye pixels 511 can be blocked by the parallax grating 520 such that it is prevented from being directed at, or received by, the right eye 502, and conversely the light emitted from the right eye pixels 511 can also be blocked by the parallax grating 520 such that it is prevented from being directed at, or received by the left eye 501.

When the left eye image observed by the left eye and the right eye image observed by the right eye have a parallax between them, stereoscopic vision can be generated in the user's brain based on the left eye image observed by the left eye and the right eye image observed by the right eye, that is, see image with 3D visual effect.

It has been realized, that in the aforementioned display device 500 of FIG. 12, particularly in 3-D images, certain aspects of common image pixels corresponding to the image displayed need to be displayed by the left eye pixels 511 and the right eye pixels 512, in such cases the value of the horizontal resolution of the image by the display device equal to half of the value of the horizontal resolution of the display panel 510.

In order to improve existing display panels, contemplated herein is an array substrate and manufacturing method thereof, a display device and driving method thereof and a manufacturing method of a display substrate are provided by embodiments of the present disclosure.

The array substrate includes a plurality of display sub-pixels. Each display sub-pixel includes a pixel electrode, a first common electrode and a second common electrode; the first common electrode and the second common electrode can then be insulated from each other and are arranged side by side on or over the array substrate. The pixel electrode can then be configured so as to interact respectively with the first common electrode and the second common electrode to respectively conduct display operations.

In some embodiments of the present disclosure, each display sub-pixel can then include a first common electrode and a second common electrode which can then be insulated from each other, as a result, the display function, 2D display function and 3D display function, can be achieved without reducing resolution.

Figure 2:
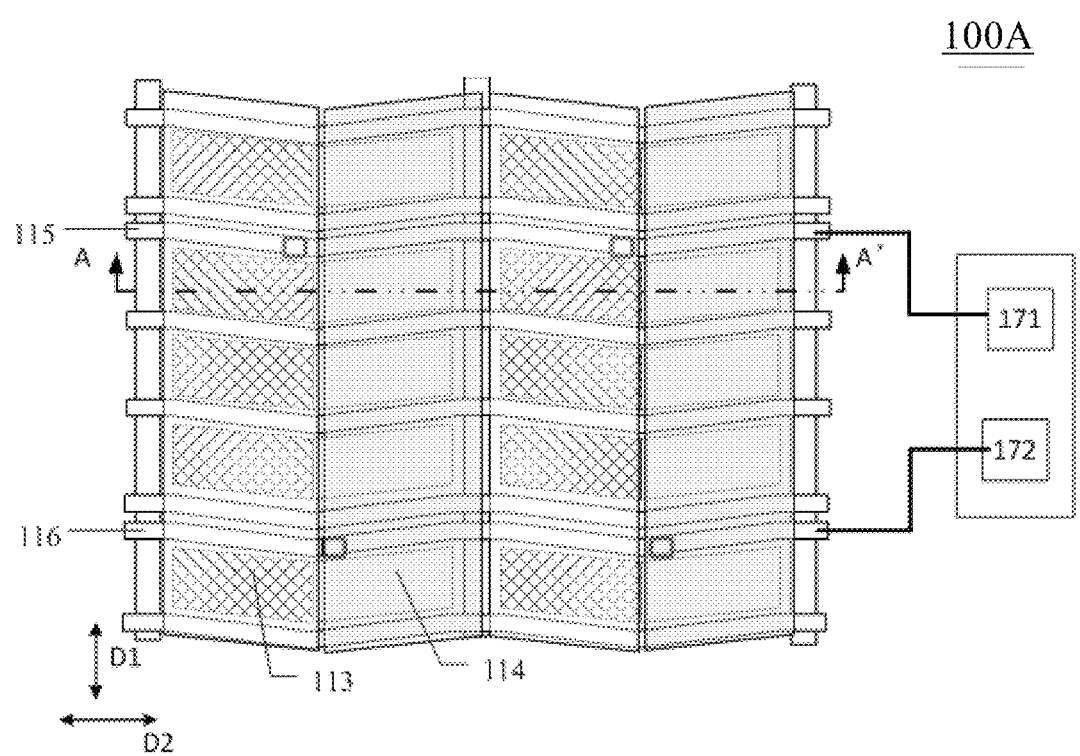
FIG. 2 is a top view of a schematic structural view of an array substrate according to some embodiments of the present disclosure.

FIG. 1 illustrates a schematic plan view of an array substrate 100 according to some embodiments of the present disclosure, while FIG. 2 illustrates a schematic structural view of the array substrate according to some embodiments of the present disclosure as attached to respective exemplary first and second common voltage terminals 171 and 172.

Figure 4:
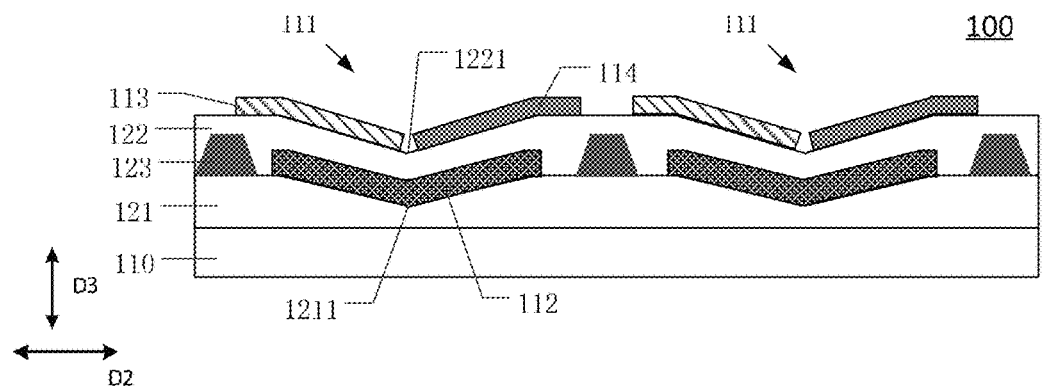
FIG. 4 is a side cross-sectional view of an array substrate according to some embodiments of the present disclosure.

Meanwhile, FIG. 4 illustrates a cross-sectional view of the array substrate according to some embodiments of the present disclosure, the cross-sectional view of FIG. 4 illustrating a cross-sectional view along the A-A' line shown in FIG. 2.

As shown in FIGS. 1 and 4, the array substrate 100 includes a base substrate 110, one or more first common voltage lines 115, and one or more second common voltage lines 116 arranged in an alternating fashion along a common edge and extending laterally through the array substrate 100. The array substrate 100 can then also include one or more gate lines 124 provided between the first and second common voltage lines, the one or more gate lines also extending laterally through the array substrate 100, of the array substrate 100 can then be provided with one or more data lines 123 provided along an alternative edge, the alternative edge being perpendicular to the common edge. such that the data lines 123 extend through the array substrate 100 substantially perpendicular to the first and second voltage lines 115 and 116 respectively.

The data lines 123 and the first and second voltage lines 115 and 116 respectively and gate lines 124 then forming a grid having cells containing a plurality of display sub-pixels 111 therebetween. In other words, as illustrated herein the plurality of display sub-pixels 111 correspond to the regions defined by the plurality of gate lines 124 and the plurality of data lines 123 crossing each other, the plurality of display sub-pixels 111 are arranged in the form of an array.

Each display sub-pixel 111 can then be provided having a pixel electrode 112 having the left side 112a and the right side 112b of a pixel electrode 112 are marked differently in FIG. 1, the left side 112a being marked by lattice and the right side 112b being marked by blank) it is only for the purpose of clear illustration, the left side 112a and the right side 112b of any particular pixel electrode 112 can be connected to each other, for example, the overall shape can be provided as a block. In other words, each sub-pixel 111 is bifurcated into two opposing regions corresponding to a left side 112a and a right side 112b.

As shown in FIG. 1, the data lines 123 extend in a first direction D1, the gate lines 124 extend in a second direction D2, the first direction D1 and the second direction D2 cross each other, for example, perpendicular to each other. However, it will be appreciated that in some more complex embodiments, the array can be formed having more than 4 edges, such as hexagonal or octagonal patters so as to form more complex grid formations.

As illustrated herein, three adjacent display sub-pixels 111 in the first direction D1 can be grouped together so as to form a display pixel 119. The first common voltage lines 115 and the second common voltage lines 116 can then extended in parallel in the second direction D2, wherein the orthographic projections of the first common voltage lines 115 and the second common voltage lines 116 on the base substrate 110 can then be spaced from each other and arranged alternately in the first direction D1.

It should be noted that, the extension of the gate lines 124, the first common voltage lines 115 and the second common voltage lines 116 in the second direction D2 only refers to the extending direction of the gate lines 124, wherein the first common voltage lines 115 and the second common voltage lines 116, does not refer to the gate lines 124, the first common voltage lines 115 and the second common voltage lines 116 themselves are in the form of straight lines that are parallel to the second direction D2.

In other words, according to practical needs, the gate lines 124, the first common voltage lines 115 and the second common voltage lines 116 can be in the form of straight lines that are parallel to the second direction D2, but they can also be polygonal lines that are not completely parallel to the second direction D2 but only extend generally in such a direction.

Similarly, although the data lines 123 in the figure are illustrated herein as straight lines extending in the first direction D1, there are no limitations herein implied thereby, for example, the data lines 123 can also be polygonal lines extending generally in the first direction D1. Such polygonal lines could then be utilized to form sub-pixels 111 having any desired shape or characteristic.

In contrast to FIG. 1, the array substrate 100A as illustrated in FIG. 2, can be arranged such that each display sub-pixel 111 can further be provided with a first common electrode 113 and a second common electrode 114, wherein the first common electrodes 113 are connected to a first common voltage line 115, while the second common electrodes 114 can then be connected to a second common voltage line 116.

As shown in FIG. 2, the first common electrodes 113 and the second common electrodes 114 can be arranged side by side over or on the array substrate 100, wherein the first and second common electrodes can then be electrically insulated from each other so as to prevent electrical interference therebetween. In other words, they can be arranged side by side on a plane defined by a surface of the array substrate 100, therefore first and second common electrodes 113 and 114 are respectively located along different portions of each of the display sub-pixels 111.

For example, the orthographic projections of the first common electrodes 113 and the orthographic projections of the second common electrodes 114 are arranged such that they are spaced from each other and arranged alternately in the second direction D2. In this manner, the first common electrode 113 can be associated with a left side 112a of each sub-pixel 111 while the second common electrode 114 can be associated with a right side 112b of each sub-pixel 112b.

As shown in FIG. 4, the first common electrodes 113 and the second common electrodes 114 can be located at a common depth or layer, as a result, the manufacturing process can be simplified. However, in some embodiments, according to practical needs, the first common electrodes 113 and the second common electrodes 114 can also be configured at different depths or layers.

As shown in FIG. 4, in a particular display sub-pixel 111 of the array substrate 100, the pixel electrodes 112 can be configured such that they are covered about an upper surface by both the first common electrodes 113 and the second common electrodes 114, i.e. in a direction that is perpendicular to the base substrate 110, as a result, when a pixel voltage is applied to the pixel electrodes 112 during display operations, the pixel electrodes 112 respectively interact with the first common electrodes 113 and the second common electrodes 114, therefore, display operations are conducted differently between respective right or left s portions of each of the display sub-pixels 111.

It should be noted, when providing the first common electrodes 113 and the second common electrodes 114 at the same depth or layer, the first common electrodes 113 and the second common electrodes 114 can be provided of a common material through the same patterning process. For example, the first common electrodes 113 and the second common electrodes 114 can be formed from a single conductive layer through a single patterning process.

In some such embodiments, the first common electrodes 113 and the second common electrodes 114 can be formed from a single mask through a single photolithography process. For example, the first common electrodes 113 and the second common electrodes 114 can be provided having a common plane; In some such embodiments, the first common electrodes 113 and the second common electrodes 114 can be provided at different planes or depths but belong to the same structural layer.

As shown in FIG. 2, the first common electrodes 113 and the second common electrodes 114 can be configured to be connected to different common voltage terminals of the driving circuit to receive a first common voltage and a second common voltage. For example, as shown in FIG. 2, the first common electrodes 113 can be connected to the first common voltage terminal 171 of the driving circuit through the first common voltage line 115 to receive the first common voltage outputted by the first common voltage terminal 171, the second common electrodes 114 can then similarly be connected to the second common voltage terminal 172 through the second common voltage line 116 to receive the second common voltage outputted by the second common voltage terminal 172.

In some embodiments, the first common electrodes 113, can be provided at one side of the array substrate, for example, the upper side or the lower side, which can also be directly connected to the first common voltage terminal 171. Similarly, the second common electrode 114, can be provided at one side of the array substrate, for example, the upper side or the lower side, which can then similarly be directly connected to the second common voltage terminal 172.

In some embodiments, the driving circuit is connected to a control device (not shown in the figures) and output having common voltages needed at different common voltage terminals according to the control signals received from the control device. The control device outputs corresponding control signals according to display modes, i.e. 2D or 3D display mode.

In some embodiments, the value of the first common voltage and the value of the second common voltage can be different, as a result, each display sub-pixel 111 can be configured to provide at least two different gray scales. For example, as shown in FIG. 2 and FIG. 7, FIG. 7 being related to the display device and will be described in detail later, during display operations, the region of the display sub-pixel 111 corresponding to the first common electrode 113, for example, the region at the left side of the display sub-pixel 111 as marked by lattice in FIG. 1, can be employed so as to provide an output from this particular image pixel relating to a first image 155, for example, the left eye image, the region of the display sub-pixel 111 corresponding to the second common electrode 114, for example, the region at the right side of the display sub-pixel 111 that is marked in white color, can be employed to provide an output from this particular image pixel relating to a second image 156, for example, right eye image.

Figure 7:
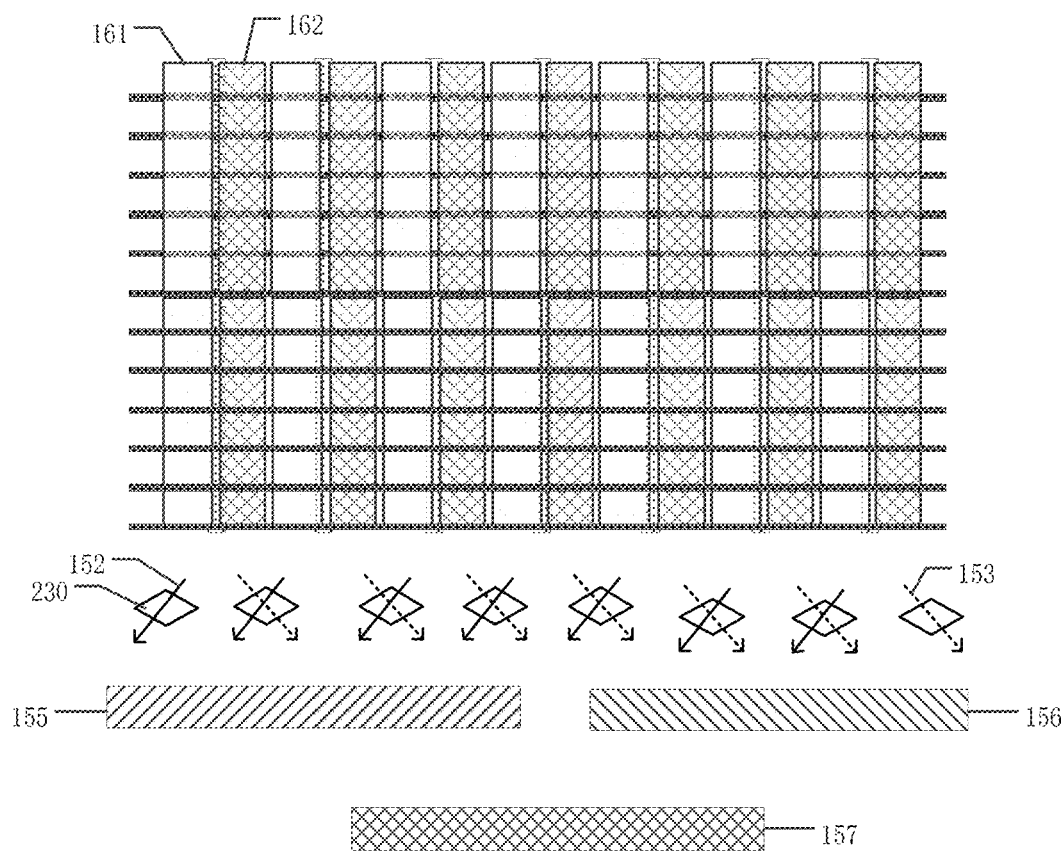
FIG. 7 is a schematic plan view and a diagram of the display principles of a display device according to some embodiments of the present disclosure.

For example, as shown in FIG. 2 and FIG. 7, when the first image 155 and the second image 156 respectively reach a left eye and a right eye of a user, the user can have stereo perception, that is, the user can see an image 157 that has 3D visual effect, as a result, the display device that includes the array substrate 100 according to embodiments of the present disclosure can achieve 3D display function without reducing resolution.

In some embodiments, the value of the first common voltage and the value of the second common voltage can also be the same, as a result, each display sub-pixel 111 can be configured to provide the same gray scale. In this case, the array substrate 100 according to some embodiments of the present disclosure can be employed to achieve 2D display function.

Compared with the display device 10 of FIG. 12, the display devices including the array substrates 100 according to embodiments of the present disclosure can realize 2D display function without reducing resolution. For the purpose of clear illustration, the principles of realizing 2D display function without reducing resolution will be described in detail in the embodiment of display device 10, it will not be repeated herein.

In some embodiments, as shown in FIG. 2, the first common electrodes 113 of at least two adjacent display sub-pixels 111 can be electrically connected, wherein the second common electrodes 114 of at least two adjacent display sub-pixels 111 can then be electrically connected, as a result, the number of common voltage lines of the array substrate 100 can be reduced, therefore, the aperture ratio of the array substrate 100 can thus be improved and the cost of the driving circuit, which for example, can be provided as an integrated circuit, can thereby be reduced as it would require reduced complexity.

In some embodiments, as shown in FIG. 2, the first common electrodes 113 of at least two adjacent display sub-pixels 111 in the first direction D1 can then belong to a first common block electrode; in some such embodiments, the second common electrodes 114 of at least two adjacent display sub-pixels 111 in the first direction D1 can thus belong to the first common block electrode.

In these embodiments, due to the first common electrodes 113 of at least two adjacent display sub-pixels 111 in the first direction D1 being electrically connected without additional connection lines and the second common electrodes 114 of at least two adjacent display sub-pixels 111 in the first direction D1 can be electrically connected without additional connection lines. By doing this, the number of common voltage lines can be reduced without increasing the complexity of the process.

In some embodiments, the first common electrodes 113 and the second common electrodes 114 can be formed at a common layer at a similar depth over the base substrate 110. In such an embodiment, the first common voltage lines 115 and the second common voltage lines 116 can then be formed at the same layer, wherein one or more intermediate insulating layers can be placed between the layer where the common electrodes are located and the layer where the common voltage lines are located.

For example, as shown in FIG. 1 and FIG. 2, the first common electrodes 113 of at least two adjacent display sub-pixels 111, which extend in the second direction D2, can be electrically connected to the same first common voltage line 115, i.e. a single first common voltage line 115, through the first via a connector 117 which extends through the intermediate insulating layer. Then, the second common electrodes 114 of at least two adjacent display sub-pixels 111 which extend in the second direction D2 can then be electrically connected to the same second common voltage line 116, a single second common voltage line 116, through the second via an alternative connector 118 which extends through the corresponding intermediate insulating layer.

In this manner, the first common electrodes 113 of at least two adjacent display sub-pixels 111 in the second direction D2 can be electrically connected and the second common electrodes 114 of at least two adjacent display sub-pixels 111 in the second direction D2 can be electrically connected without configuring additional connection lines, as such, the number of common voltage lines can be decreased without increasing complexity of the process.

Figure 3A:
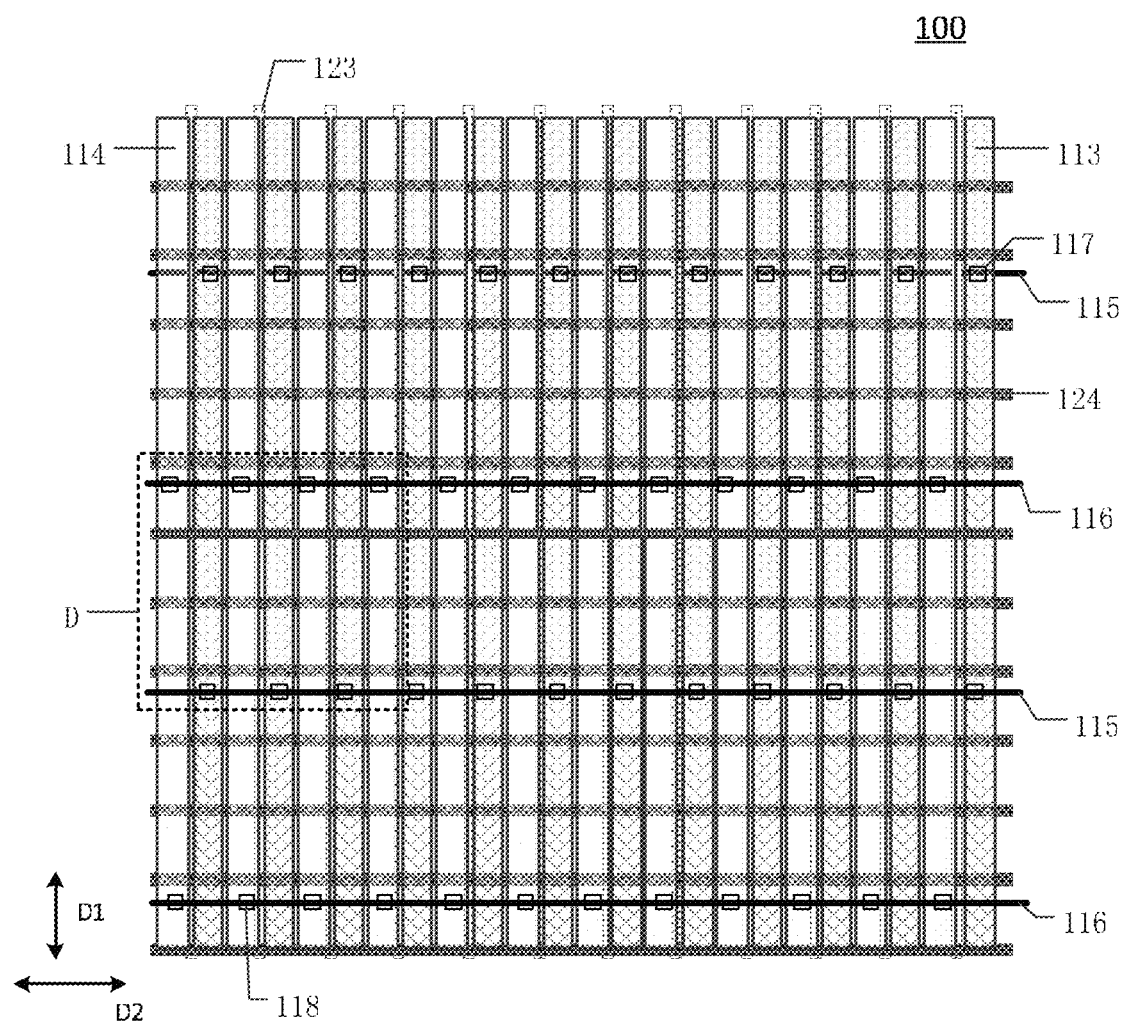
FIG. 3A is a top view of a schematic plan view of another array substrate according to some embodiments of the present disclosure.
Figure 3B:
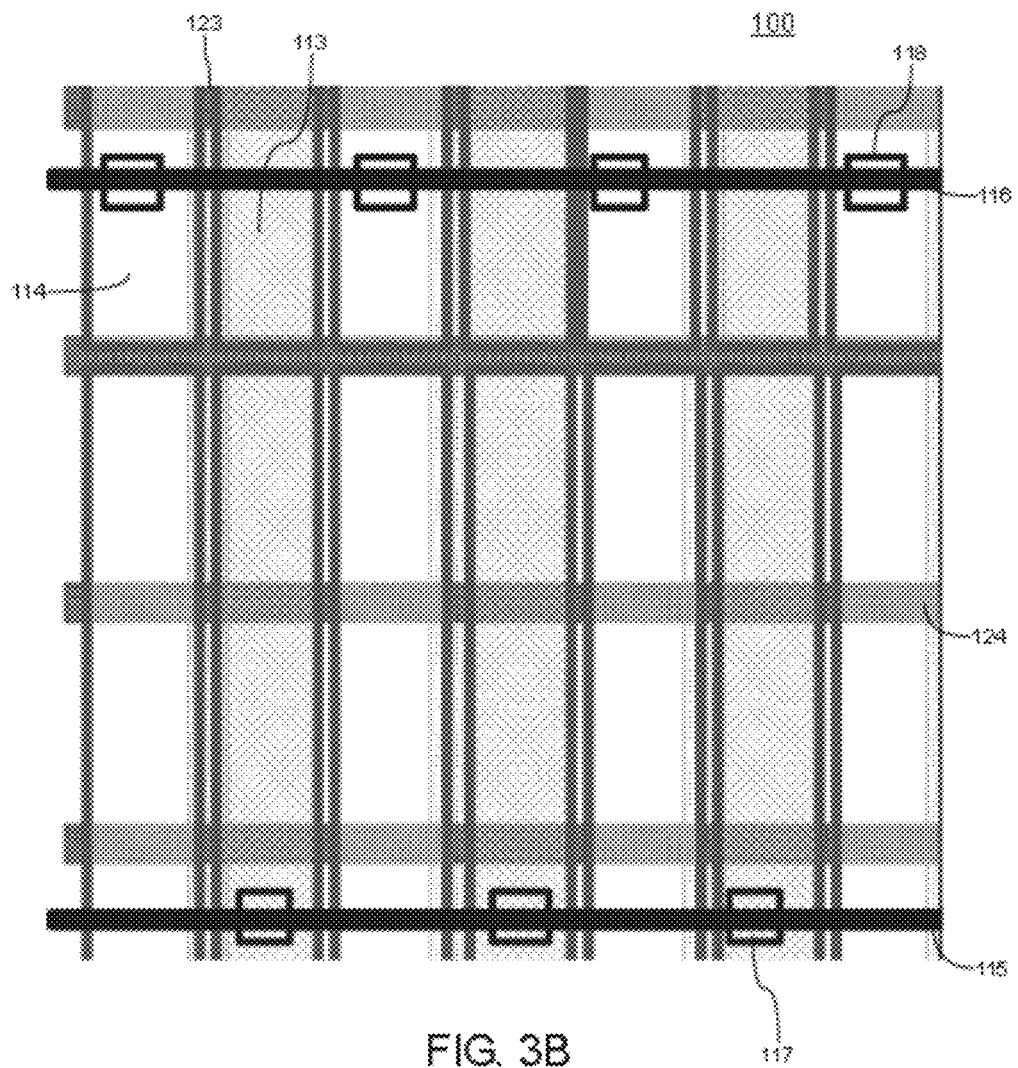
FIG. 3B is an enlarged top view of the D region of the array substrate of FIG. 3A.

FIG. 3A illustrates a schematic plan view of another array substrate 100 provided by embodiments of the present disclosure, FIG. 3B is an enlarged view of the D region of the array substrate 100 of FIG. 3A.

As shown in FIG. 3A and FIG. 3B, the first common electrodes 113 of adjacent display sub-pixels 111 in the first direction D1 can be configured such that they belong to a common block electrode, wherein the second common electrodes 114 of the illustrated on an opposing side of each adjacent display sub-pixels 111 as extending in the first direction D1 can similarly belong to an alternative common block electrode.

Additionally, the first common electrodes 113 of each adjacent display sub-pixels 111 in the second direction D2 can then each be connected to the same first common voltage line 115, and, the second common electrodes 114 of the each adjacent display sub-pixels 111 in the second direction D2 can then similarly each be all connected to the same second common voltage line 116.

It will be appreciated that the number of adjacent display sub-pixels 111 first common electrodes 113, and second common electrodes 113 within the matrix or array can be expanded or reduced or otherwise adjusted to meet a particular need. For example, in order to further reduce the number of common voltage lines, at the number of adjacent display sub-pixels 111 can then be configured as a larger value. For example, in order to improve the gray scale control precision of the display sub-pixels 111, at least one of M and N can be configured to be a smaller value.

It should be noted, the schematic plan view of the first common electrodes 113 and the second common electrodes 114 as shown in FIG. 2 is provided only for exemplary purposes, and that based on practical needs, the shapes of the first common electrodes 113 and the second common electrodes 114 can also be rectangular or any other suitable polygonal shape.

For example, in the cross-sectional view of FIG. 4, for each sub-pixel 111, the orthographic projection, that is, the shape of the cross-section in the cross-sectional view, of the first common electrode 113 and the second common electrode 114 over the projection plane, that is, the surface of the paper, is roughly in a first concave shape, for example, a first V shape, the orthographic projection of the pixel electrode 112 over the projection plane is roughly in a second concave shape, the first concave shape and the second concave shape, for example, a second corresponding V shape, which correspond to each other in the direction that is perpendicular to the base substrate 110.

As a result, optical distortion of the display device 10 including the array substrate 100 will be reduced. For example, the shapes of the first concave shape and the second concave shape are roughly the same or similar, due to the fact that they nest within each other. As a result, the first concave shape and the second concave shape have corresponding portions that are "parallel" to each other, therefore, the distances between the common electrodes and the pixel electrode are substantially uniform, which, as a result, can operate so as to further reduce optical distortion.

In some embodiments, the orthographic projection of a pixel electrode 112 over the base substrate respectively can be configured such that it overlaps with the orthographic projection of a first common electrode 113 and the orthographic projection of a second common electrode 114 over the base substrate.

In this manner, the orthographic projection of the first concave shape over the base substrate and the orthographic projection of the second concave shape over the base substrate completely overlap one another. In some such embodiments, the first concave shape and the second concave shape can be made from the same mask. For the purpose of clear illustration, the principle of reducing optical distortion will be described in the paragraphs related to the display device, it will not be repeated herein.

As shown in FIG. 2, the projection plane marked by the section line A-A' is perpendicular to the extending direction of the first common electrodes 113, for example, it can extend orthogonally from of the plane defined by D1 and D2 as shown in FIG. 3A, or in the direction of D3 as shown in FIG. 4. In some embodiments, the size of each of the first common electrodes 113 provided which extend in the direction of the first common electrodes 113 can be larger than the sizes of each the first common electrodes 113 provided in the direction perpendicular to the extending direction of the first common electrodes 113.

In some embodiments, as shown in FIG. 4, the array substrate further includes a first insulating layer 121 and a second insulating layer 122, the first insulating layer 121, the pixel electrodes 112, the second insulating layer 122 and the common electrodes, that is, the first common electrodes 113 and the second common electrodes 114, are configured successively over the base substrate 110. In the embodiment of the present disclosure, and as shown in FIG. 4, the pixel electrodes 112 and the data lines 123 are positioned generally at the same layer.

It should be noted, the positional relationship of the first insulating layer 121, the pixel electrodes 112, the second insulating layer 122 and the common electrodes is only an example, there are no limitations herein. For example, according to practical needs, the common electrodes 113 and 114 can also be positioned between the pixel electrodes 112 and the base substrate 110. In other words, in relation to the base substrate 110, the pixel electrodes 112 can be positioned at the top and the common electrodes 113 and 114 could instead be provided directly on the substrate under the pixel electrodes.

In some embodiments, the common voltage lines, i.e. the first common voltage lines 115 and the second common voltage lines 116, and the gate lines 124 can be positioned within a common layer; in this case, the common voltage lines and the gate lines 124 can then be formed in the same alternating formation or pattern using a common process. In some embodiments, the common voltage lines and the gate lines 124 can also be provided at different layers and an insulating layer can then be provided between the common voltage lines and the gate lines 124. In some such embodiments, the common voltage lines and the gate lines 124 can be formed respectively in different patterning process, for example, different conductive layers are patterned.

In some such embodiments, a process can be utilized in which the common voltage lines can be formed by means of patterning the transparent conductive layer, forming the gates line 124 through patterning the metal layer. In some such cases, the need to employ a black matrix 221 to block the common voltage lines can be eliminated. In this manner, the aperture ratio of the array substrate 100 can therefore be improved. For example, the common voltage lines and the gate lines 124 can be located at the side of the common electrodes that is close to the base substrate 110; for example, the common voltage lines and the gate lines 124 can also be located at the side of the common electrodes that is far away from the base substrate 110.

In some embodiments, as shown in FIG. 4, the surface of the first insulating layer 121 can include a plurality of concave portions corresponding to the plurality of display sub-pixels 111. For example, as shown in FIG. 4, the orthographic projections of the concave portions 1211 of the first insulating layer over the base substrate 110 can be completely located inside a region defined by the orthographic projections of the display sub-pixels 111 over the base substrate 110.

As shown in FIG. 4, the thickness of the first insulating layer 121 at the side where the first common electrodes 113 and the second common electrodes 114 facing each other is larger than its thickness at the side where the first common electrodes 113 and the second common electrodes 114 are adjacent to each other.

In other words, the thickness of the first insulating layer 121 corresponding to the centers of the display sub-pixels 111 is smaller than the thickness of the first insulating layer 121 corresponding to the edges of the display sub-pixels 111 such that it varies with respect to the variations caused by the concave portion of the pixel electrode 112 supported thereby extending thereinto with respect to the base substrate 110.

As shown in FIG. 4, the pixel electrodes 112 can then be located inside the concave portions 1211 of the first insulating layer. Because the pixel electrodes 112 are formed over the surface of the concave portions 1211 of the first insulating layer, the cross-sectional shape of each pixel electrode 112 can also be described as having roughly a concave shape, for example, a second concave shape.

As shown in FIG. 4, the surface of the second insulating layer 122 includes a plurality of concave portions 1221 corresponding to the plurality of display sub-pixels 111 and the plurality of concave portions 1211 of the first insulating layer 121, the orthographic projection of each concave portion 1221 of the second insulating layer 122 over the base substrate 110 is at least partially overlapped with the orthographic projection of a corresponding concave portion 1211 of the first insulating layer 121 over the base substrate 110. In some such embodiments, the orthographic projection regions of the each concave portion 1221 and the and 1211 of the corresponding insulating layers can be completely overlapped.

As shown in FIG. 4, for each sub-pixel 111, at least a portion of the first common electrode 113 and a portion of the second common electrode 114 are formed inside the corresponding concave portion 1221 of the second insulating layer, as a result, the sectional shape of the first common electrode 113 and second common electrode 114 in the cross-sectional view is also formed having a concave shape, which can then be referred to as a first concave shape. In this embodiment, the first common electrode 113 and the second common electrode 114 are then formed such that they tilt towards the base substrate 110 from the side where they face each other to the side where they are adjacent to each other.

As shown in FIG. 4, the base substrate 110 is roughly in the shape of a plate, however, there are no limitations herein. For example, in some embodiments, the surface of the side of the base substrate 110 that is close to the common electrodes can also include concave portions. In this case, the concave portions 1211 of the first insulating layer can be formed without a separate patterning process for the first insulating layer 121 as the base substrate will support the insulating layer and impart concave portions thereto.

In some embodiments, each display sub-pixel 111 can include a first common electrode 113 and a second common electrode 114 which can be insulated from each other. As a result, the display devices including the array substrate 100 according to embodiments of the present disclosure can realize more than one display function, i.e., 3D display function as opposed to a 2D display function, without reducing resolution in the switch therebetween. It should be noted, the array substrate 100 according to embodiments of the present disclosure can be employed to form a liquid crystal display panel or self-luminous display panel. Some examples thereof being organic light-emitting display panels. When the array substrate 100 is implemented as a self-luminous display panel, the display sub-pixel 111 can further includes a light-emitting layer.

In some such embodiments, the region of the light-emitting layer corresponding to the first common electrode and the region of the light-emitting layer corresponding to the second common electrode can be electrically insulated from each other, for example, arranged spaced from each other, or alternatively they can be electrically connected to one another.

According to some embodiments of the present disclosure, a first common electrode and second common electrode can be a plate electrode or a slit electrode. For example, a comb electrode for the slit electrode. Further, the pixel electrode can also be provided as a plate electrode or a slit electrode.

Although according to the embodiment shown in FIG. 4, the pixel electrodes and the common electrodes, i.e. the first common electrode and the second common electrode, are located at different layers, according to some other embodiments of the present disclosure, the positional relationship between the pixel electrodes and the common electrodes are not limited to the aforementioned position relationship shown in FIG. 4. There are no limitations with regard to this positioning so long as the pixel electrode of each subpixel interacts respectively with the first common electrode and the second common electrode in the same sub-pixel when conducting display operations.

For example, the pixel electrodes and the common electrodes can also be located at the same layer so as to form an in-plane switching (IPS) array substrate. In some such embodiments, the pixel electrodes and the common electrodes can both be provided as comb electrodes, wherein the teeth portions of the pixel electrodes and the teeth portions of the common electrodes can be placed in a staggered formation.

According to these embodiments, the orthographic projection of the pixel electrode of each subpixel over the base substrate can be provided as a side-by-side arrangement with the orthographic projections of the first common electrode and the second common electrode of the same subpixel over the base substrate.

In addition, according to this embodiment, the overall shape of the electrode portions of the pixel electrode and the common electrodes can be provided having a concave shape. For example, the portion of the pixel electrode and the first common electrode that are arranged staggered and side-by-side can be located at one side of the concave shape, whereas the portion of the pixel electrode and the second common electrode that are arranged staggered and side-by-side can instead be located at another or opposing side of the concave shape, wherein the two sides face one another.

In another aspect, a display substrate is provided, the display substrate can be used together with the array substrate of the aforementioned embodiments. The display substrate includes a first substrate, the first substrate includes concave portions corresponding to the display sub-pixels provided above the array substrate, wherein a lens can then also be provided in each of the concave portions. In some such embodiments, the lens can be provided as a micro-lens.

In the following, with reference to FIG. 5A and FIG. 5B, a display substrate 200 can be provided in accordance with various embodiments of the present invention and will be described in detail below. As shown in the cross-sectional view of FIG. 5A, the display substrate 200 includes a first substrate and a lens layer. The first substrate includes a base substrate 210 and a color film layer 220 configured successively, therefore, this display substrate is a color film substrate.

The color film layer 220 includes a plurality of color filter portions 222 and a plurality of black matrixes 221 configured in the spaces among the plurality of adjacent color filter portions 222, the orthographic projection of each black matrix 221 over the projection plane, that is, the cross-section that is parallel to the second direction D2 and the third direction D3, can be in the shape of an inverse ladder. The third direction D3 and the second direction D2 can be arranged such that they intersect one another, for example, they can be arranged perpendicular to each other, or at varying alternative angles as appropriate.

Figure 6:
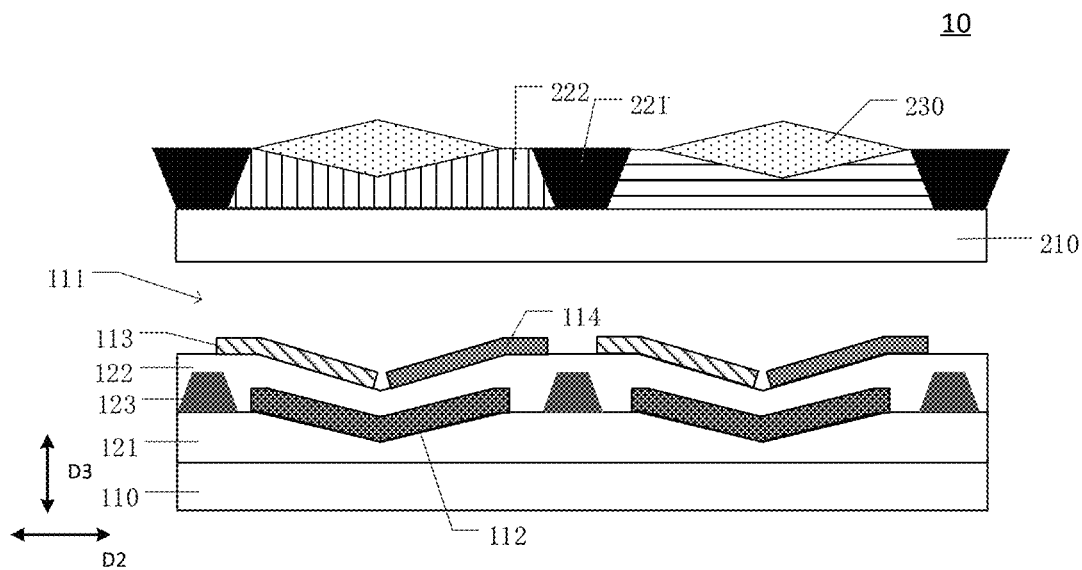
FIG. 6 is a side cross-sectional view of a display device according to some embodiments of the present disclosure.

As shown in FIG. 6, the color filter portions 222 and the display sub-pixels of the array substrate 100 can be arranged corresponding to one another. For example, after the display substrate 200 and the array substrate 100 are combined, the orthographic projections of the color filter portions 222 can be placed such that the base substrate 210 is located inside of the concave portions of each of the display sub-pixels 111. In some such embodiments the base substrate 210 can be formed so as to have a cross-sectional shape corresponding to an upper surface of each display sub-pixel 111.

As shown herein, the surface of each color filter portion 222 which faces away or in an opposing direction from the base substrate 210 can also include a concave portion. In some embodiments, adjacent color filter portions 222 in the first direction D1 can be provided having alternating or various patterns of varying colors, However, in some embodiments, each of the adjacent color filter portions 222 in one or more matrix rows can as the row extends in the second direction D2 can be provided having a common or similar color.

Figure 5A:
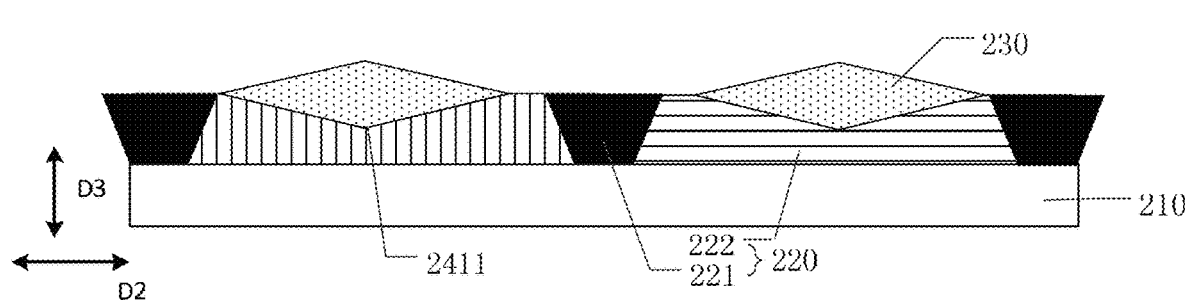
FIG. 5A is a side cross-sectional view of a display substrate according to some embodiments of the present disclosure.

As shown in FIG. 5A, the lens layer can include a plurality of microlenses 230 arranged in the form of an array, the plurality of microlenses 230 which can be arranged on an interior surface of each of the concave portions 2411 of corresponding color filter portions 222. In some embodiments these microlenses 230 can be bonded to the color filter portions 222.

As illustrated herein, the surfaces of the microlenses 230 which are in contact with the color filter portions 222 can be provided such that they are parallel with the surfaces of the concave portions 2411 of the color filter portions 222 corresponding to the microlens 230. As a result, this arrangement allows for a situation in which no gaps exist between the microlenses 230 and the color filter portions 222.

As illustrated herein, including concave portions to the surfaces of the color filter portions 222, not only eliminates the need for a separate fixation process of the microlenses 230, but also the microlenses 230 can be more securely placed within the display substrate 200. As a result, the manufacturing process is simplified and the display robustness of the display substrate 200 is improved. For example, a plurality of microlenses 230 correspond to a plurality of color filter portions 222 can be provided in a one-to-one ratio.

Figure 5B:
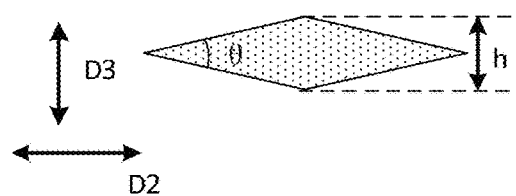
FIG. 5B is a side cross-sectional view of the microlens according to some embodiments of the present disclosure.

As shown in FIG. 5B, the sectional shape of a microlens 230 in the cross-sectional view is illustrated herein having a diamond shape, the angle of the diamond, i.e. the acute angle, is θ, while the thickness of the microlens 230 in the third direction D3 is h.

It should be noted, the cross-sectional shape of the microlens 230 is not limited to a diamond, according to practical needs, the cross-sectional shape of the microlens 230 can also be an oval, a semi ellipse, or any other suitable shape.

When the shapes of the microlenses 230 are changed, the shapes of the concave portions of the display substrate 200 can be changed accordingly, so that the shapes of the concave portions of the display substrate will match the shapes of the microlenses 230 and the microlenses 230 can be affixed in a stable manner in the display substrate 200. As a result, optical distortion and image deterioration caused by the movement or gaps of the microlenses with respect t to the display substrate can be reduced.

For example, when the display substrate 200 and the array substrate 100 are used together, concave portions that match the concave portions of the display substrate 200 can be positioned within the display sub-pixels of the array substrate 100, as a result, optical distortion can be further reduced and image quality can be improved.

For example, when the section shapes of the microlenses 230 are ovals or semi-ellipses, the corresponding cross-sectional shapes of the concave portions of the display substrate 200 can also be provided as semi-ellipses. Further, when the array substrate 100 is used together with the display substrate 200 can also include concave portions. The concave portions of the array substrate 100 can also be adjusted according to the shapes of the microlenses 230, such that the shapes of the concave portions of the array substrate 100 correspond with the shapes of the microlenses 230.

It should be noted, the microlenses 230 are not limited to being positioned inside the concave portions of the color filter portions 222. For example, in various alternative embodiments, the base substrate 210 can include concave portions, the microlenses 230 can then be placed on an inside of the concave portions of the base substrate 210, wherein the color filter portions 222 can then be placed along or about a side of the microlenses 230.

In some such embodiments the side on which the color filter portions are placed can be an exterior or opposing side of each particular microlens 230 which is opposite from the base substrate 210. In this particular embodiment, there is no need to provide a separate planarization layer for the microlenses 230 at the side of the microlenses 230 that is opposite from the base substrate 210, therefore the manufacturing process can be simplified and the thickness of the display substrate 200 can be reduced.

For example, according to practical needs, the display substrate 200 can further include a dielectric layer, and the dielectric layer can include concave portions corresponding to the display sub-pixels 111 of the array substrate 100. In such an instance, the microlenses 230 can be provided about an inside of the concave portions of the dielectric layer, as a result, the design flexibility of the display substrate 200 can be improved.

In some instances, when the display substrate 200 includes the color film layer 220 and the dielectric layer, the dielectric layer can be provided about a side portion of the color film layer 200 that is far away from the base substrate 210. Alternatively, as illustrated in FIG. 5A, when the dielectric layer is implemented as the color film layer 220, the structure of the display substrate 200 can be including the dielectric layer.

In another aspect of the present invention, a display device can also be provided. In some embodiments, the display device can further include the array substrate as discussed above in relation to any one of the embodiments of the present disclosure. In the following, the display device will be descried in detail with reference to FIG. 6 and FIG. 7.

In particular, FIG. 6 illustrates a cross-sectional view of an exemplary display device 10 according to some embodiments of the present disclosure. As shown in FIG. 6, the display device 10 can include one or more array substrates as discussed above, wherein each display substrate can be arranged facing one another.

It will then be appreciated that the array substrates can be provided as the array substrate 100 as illustrated in FIG. 4, or, alternatively, the display substrate can be the display substrate 200 as illustrated in FIG. 5. As shown in FIG. 6 and FIG. 4, the array substrate 100 can include the display sub-pixels 111 provided over the base substrate 110, the display sub-pixels 111 wherein the substrate can also include a first insulating layer 121, the pixel electrodes 112, the second insulating layer 122 and the common electrodes, i.e. the first common electrodes 113 and the second common electrodes 114, arranged successively over the base substrate 110, and the first common electrodes 113 and the second common electrodes 114. In some such embodiments, the first common electrodes 113 can be insulated from the second common electrodes 114.

As shown in FIG. 6 and FIG. 5A, the display substrate 200 can also include the color film layer 200 and the lens layer arranged successively over the base substrate 210. The color filter portions 222 and the display sub-pixels 111 of the array substrate 100 can be arranged facing each other.

In some such embodiments, the surfaces of the color filter portions 222 on the opposing or exposed surface from the base substrate 210 can include concave portions, wherein the microlenses 230 can be placed or arranged within an inside surface of the concave portions of the color filter portions 222.

In some embodiments, the display device can be provided as a liquid crystal display device, wherein the liquid crystal display device can further include a liquid crystal layer, (not shown in figures), wherein the liquid crystal layer can be arranged or placed between the array substrate 100 and the display substrate 200.

Additionally, a backlight source can also be provided to the display device, (not shown in figures), wherein the backlight source can be placed or position about a side portion of the array substrate 100, this side portion being located about a surface array substrate 100 that is opposite the display substrate 200.

FIG. 7 is a schematic plan view and a display principle diagram of the display device 10 according to some embodiments of the present disclosure, the display device 10, for example, corresponds to the display device shown in FIG. 6. As shown in FIG. 7, the display device 10 includes first display regions 161 corresponding to the second common electrodes 114 and a second display regions 162 corresponding to the first common electrodes 113.

For example, the microlenses 230 are configured to separate the light 151 emitted by the first display regions and the light 152 emitted by the second display regions, so that a first image 155 and a second image 156 that are separated in space can be formed within the working distance range of the display device 10. For example, light 152 emitted by the first display regions is employed to form the image pixel of the first image 155, for example, the left eye image, light 153 emitted by the second display regions is employed to form the image pixel of the second image 156, i.e. the right eye image.

In some embodiments, the first common voltages received by the first common electrodes 113 and the second common voltages received by the second common electrodes 114 are different. In some embodiments, the strength of the light 152 emitted by the first display regions 161 and the strength of the light 153 emitted by the second display regions 162 can also be different.

By varying the voltages received by the first or second common electrodes and the corresponding strength of light images having varying properties can then ultimately be displayed between the right and left eye, which, as a result, allows for display of a first image 155 and a second image 156 wherein parallax exists between them.

In such a case, when a left eye and a right eye of a user respectively receive a first image 155 and a second image 156, the user can have stereoscopic perception, that is, the user can see a 3D image 157. Therefore, the display device 10 according to some embodiments of the present disclosure can realize 3D display function without reducing resolution.

In some embodiments, when the first common voltages received by the first common electrodes 113 and the second common voltages received by the second common electrodes 114 are the same. In such an instance, the strength of the light 152 emitted by the first display regions 161 and the strength of the light 153 emitted by the second display regions 162 would then be the same, as a result, the first image 155 and the second image 156 are essentially the same.

In this case, when a left eye and a right eye of a user respectively receive a first image 155 and a second image 156, the user can see a 2D image. In addition, the resolution of the display device 10 in FIG. 7 is M1×N1, wherein, M1 is the number of display pixels in the second direction D2, N1 is the number of display pixels in the first direction D1, that is, the display device 10 in FIG. 7 can realize 2D display function without reducing resolution.

It should be noted, persons skilled in the art should understand, other necessary components, for example, control devices, image data coding/decoding devices, line scan drivers, column scan drivers, clock circuits and so on, as would be necessary for utilization of the display device can be adopted, there are no limitations herein. The display device can also be any products or components that have display function such as mobile phones, tablets, televisions, monitors, laptops, digital frames and navigators.

In another aspect, a manufacturing method of the array substrate according to embodiments of the present disclosure is also contemplated herein, the manufacturing method including the steps of:

providing a base substrate; and forming a plurality of display sub-pixels over the base substrate, wherein, forming the display sub-pixels includes:

forming first common electrodes and second common electrodes over the base substrate, wherein, the first common electrodes and the second common electrodes are insulated from each other and are configured side by side over the array substrate; and forming pixel electrodes. The pixel electrodes are formed to respectively interact with the first common electrodes and the second common electrodes so as to conduct display operations.

In the following, the array substrate 100 as shown in FIG. 4 is employed as an example, with reference to FIG. 8A, FIG. 8B, FIG. 8C, FIG. 8D and FIG. 8E, the manufacturing method of the array substrate will be described in detail. FIG. 8A, FIG. 8B, FIG. 8C, FIG. 8D and FIG. 8E correspond to the cross-sectional view along the section line A-A' in FIG. 2. In the following description, when there is no conflict, different characteristics in specific embodiments can be combined to obtain new embodiments, these new embodiments are also within the scope of protection of the present disclosure.

The manufacturing method of the array substrate 100 includes the following Step S101-Step S105.

Figure 8A:
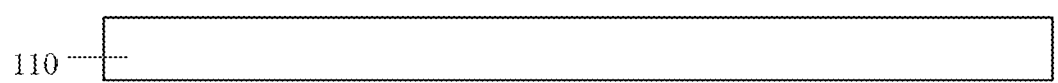
FIG. 8A illustrates a side cross-sectional view of a first sequential stage of manufacturing for creating the array substrate as shown in FIG. 4.

Step S101 is the step of: providing a base substrate 110, with particular reference to FIG. 8A.

In some embodiments, the base substrate can be a glass substrate, a quartz substrate, a plastic substrate, for example, polyethylene terephthalate (PET) substrate, or a substrate made of other suitable material.

Figure 8B:
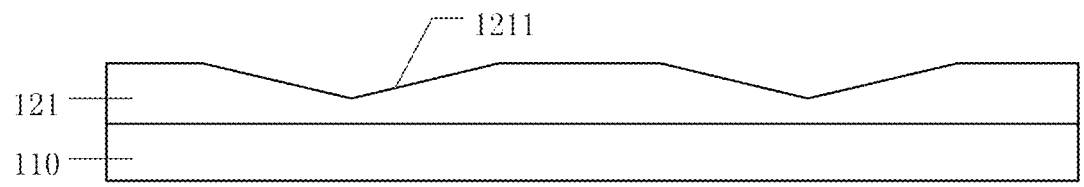
FIG. 8B illustrates a side cross-sectional view of a second sequential stage of manufacturing for creating the array substrate as shown in FIG. 4.

Step S102 is the step of: forming a first insulating layer 121, with particular reference to FIG. 8B.

In some embodiments, forming a first insulating layer 121 can further include the steps of: forming the first insulating layer 121 over the base substrate 110 and patterning the first insulating layer 121 so that the concave portions 1211 of the first insulating layer can be formed over the surface of the first insulating layer 121 that is opposite from the base substrate 110.

In some embodiments, the first insulating layer 121 can be formed by material including inorganic material such as silicon dioxide (SiOx), silicon oxynitride (SiNxOy) or silicon nitride (SiNx) or organic material or other suitable material.

In some embodiments, before forming the first insulating layer 121, over the base substrate 110, forming gate electrodes that will be employed in thin film transistors; forming gate lines, common voltage lines and so on, the gate electrodes and the gate lines are connected or integrated; and forming the first insulating layer 121 as a gate insulating layer.

In some embodiments, after forming the first insulating layer 121, forming an active layer over the first insulating layer 121, the material of the active layer can be amorphous silicon, polysilicon, oxide semiconductor, for example, indium gallium zinc oxide (IGZO), and so on.

Figure 8C:
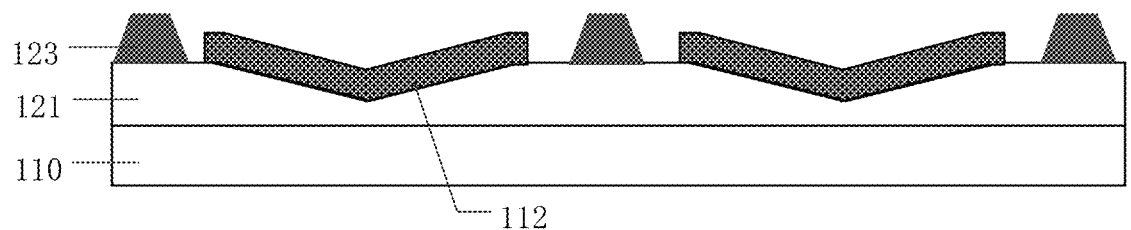
FIG. 8C illustrates a side cross-sectional view of a third sequential stage of manufacturing for creating the array substrate as shown in FIG. 4.

Step S103: forming pixel electrodes 112 and data lines 123, with reference to FIG. 8C.

In some embodiments, forming the pixel electrodes 112 and the data lines 123 can include the following step S1031 and step S1032:

Step S1031 relates to a process of forming a first conductive layer over the first insulating layer 121 and patterning the first conductive layer to form the pixel electrodes 112.

Step S1032 relates to a process of forming a second conductive layer over the first insulating layer 121 and patterning the second conductive layer to form the data lines 123.

In some embodiments, the first conductive layer can be formed by transparent conductive material, transparent conductive material can be indium tin oxide (ITO) material or indium zinc oxide (IZO) material. The second conductive layer can be formed by metal material, for example, copper, aluminum or aluminum alloy. Step S1031 can be completed before or after step S1032, there are no limitations herein.

Figure 8D:
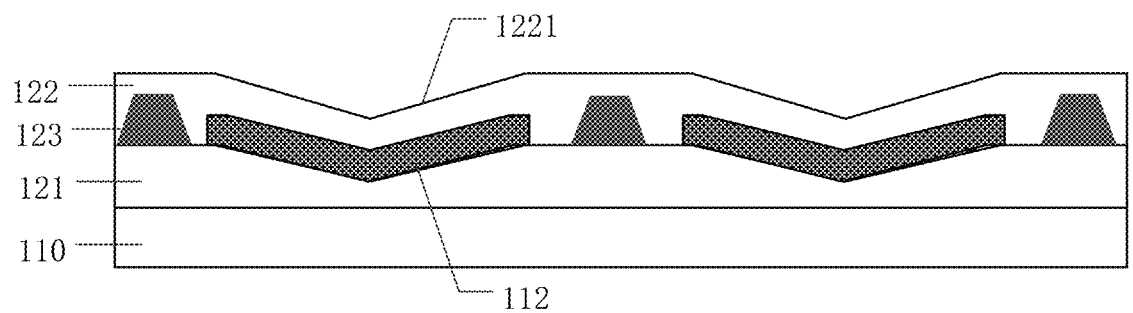
FIG. 8D illustrates a side cross-sectional view of a fourth sequential stage of manufacturing for creating the array substrate as shown in FIG. 4.

In addition to forming the data lines, further, forming the source electrodes and drain electrodes that are employed in thin film transistors, the source electrodes can be connected to or integrated with the data lines 123, and the pixel electrodes 112 can be connected to the drain electrodes.

Wherein step S104 relates to a process of forming a second insulating layer 122, with reference to FIG. 8D.

For example, forming the second insulating layer over the aforementioned structure including source electrodes, drain electrodes, data lines and pixel electrodes. The second insulating layer can then include concave portions 1221, and wherein the concave portions 1221 of the second insulating layer can correspond to the concave portions 1211 of the first insulating layer in the direction that is perpendicular to the base substrate 110.

In some embodiments, the second insulating layer 122 can be made of inorganic material such as silicon dioxide (SiOx), silicon oxynitride (SiNxOy) or silicon nitride (SiNx) or organic material or other suitable material.

Then, channels or gaps that expose the common voltage lines can be formed at the second insulating layer, in this manner the common electrodes formed later can be electrically connected to the common voltage lines.

In some embodiments, the second insulating layer 122 can be employed as a passivation layer to cover and protect thin film transistors.

Figure 8E:
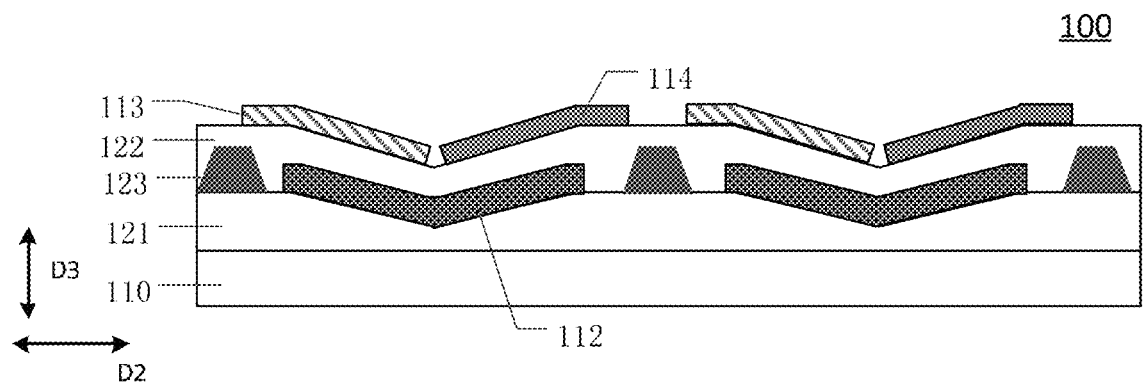
FIG. 8E illustrates a side cross-sectional view of a fifth sequential stage of manufacturing for creating the array substrate as shown in FIG. 4.

Step S105 relates to a process of forming first common electrodes 113 and second common electrodes 114 (with reference to FIG. 8E).

In some embodiments, steps relating to the formation of the first common electrodes 113 and the second common electrodes 114 can further include step of: forming a third conductive layer over the second insulating layer 122 and patterning the third conductive layer to form the first common electrodes 113 and the second common electrodes 114. In some such embodiments, the third conductive layer can be formed by transparent material, the transparent material, for example, can be indium tin oxide (ITO) or indium zinc oxide (IZO).

As shown in FIG. 8E, the first common electrodes 113 and the second common electrodes 114 can be arranged side by side and also be insulated from one another; the sectional shape of a first common electrode 113 and a second common electrode 114 of a subpixel as a whole in the cross-sectional view can be provided having a first concave shape; the sectional shape of the pixel electrode 112 in relation to the base substrate 110 in the cross-sectional view can be provided having a second concave shape.

It should be noted, when the structure of the array substrate 100 is changed, step S101-step S105 can be adjusted accordingly.

In another aspect of the present invention, a manufacturing method of a display substrate is contemplated in which the manufacturing method can include the steps of: providing a first substrate, forming a plurality of concave portions over the surface of the first substrate; forming the lens material layer onto the concave portions, patterning the lens material layer to form microlenses located inside the concave portions.

In some embodiments, the first substrate can include the base substrate; and the manufacturing method of the display substrate can include the steps of: forming the first dielectric layer over the surface of the base substrate and forming the concave portions in the first dielectric layer.

In some embodiments, the first dielectric layer can be a color film layer, in some other embodiments, the first dielectric layer can be the base substrate 210.

Figure 9A:
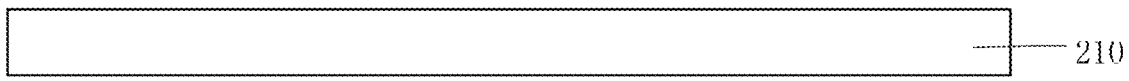
FIG. 9A illustrates a side cross-sectional view of a first sequential stage of manufacturing for creating the display substrate as illustrated in FIG. 5A.
Figure 9B:
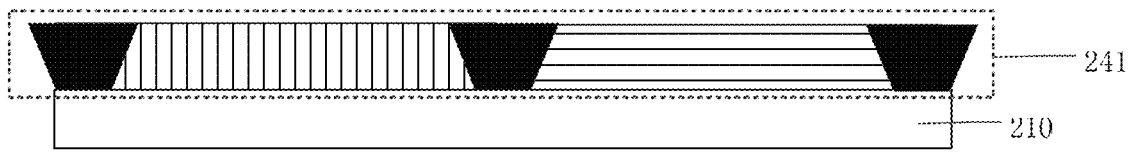
FIG. 9B illustrates a side cross-sectional view of a second sequential stage of manufacturing for creating the display substrate as illustrated in FIG. 5A.

In the following, the display substrate shown in FIG. 5 is employed as an example, with reference to FIG. 9A, FIG.

Figure 9C:
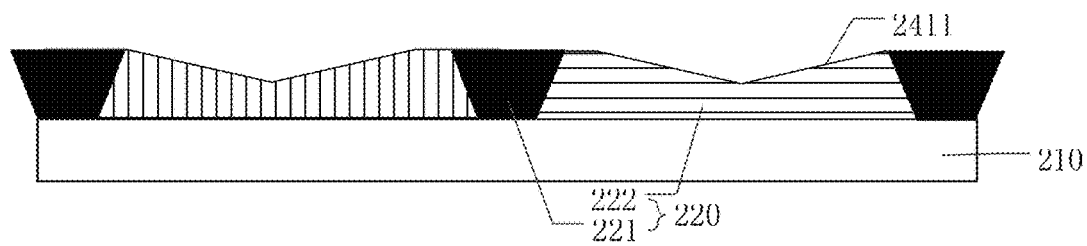
FIG. 9C illustrates a side cross-sectional view of a third sequential stage of manufacturing for creating the display substrate as illustrated in FIG. 5A.
Figure 9D:
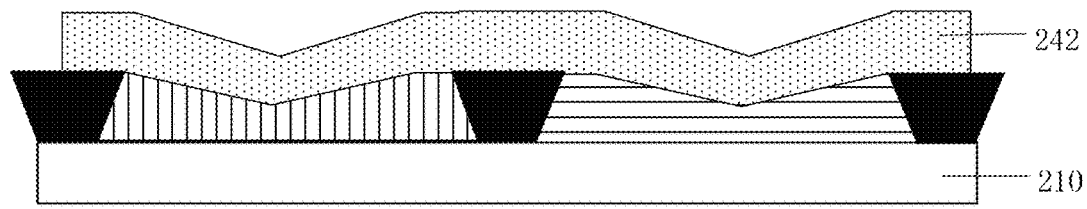
FIG. 9D illustrates a side cross-sectional view of a fourth sequential stage of manufacturing for creating the display substrate as illustrated in FIG. 5A.
Figure 9E:
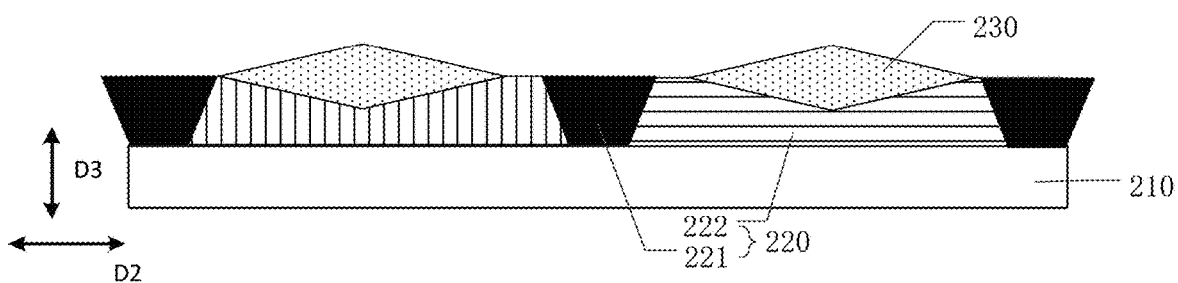
FIG. 9E illustrates a side cross-sectional view of a fifth sequential stage of manufacturing for creating the display substrate as illustrated in FIG. 5A.

9B, FIG. 9C, FIG. 9D and FIG. 9E, the manufacturing method of the display substrate 200 according to embodiments of the present disclosure will be described in detail. FIG. 9A, FIG. 9B, FIG. 9C, FIG. 9D and FIG. 9E are cross-sectional views along the section line A-A' in FIG. 2. The manufacturing method of the display substrate 200 can then include the following step S111-step S115.

Step S111 relates to a process of providing a base substrate 210.

For example, the base substrate 210 can be a glass substrate, a quartz substrate, a plastic substrate, for example. polyethylene terephthalate (PET) substrate, or a substrate made of other suitable material.

Step S112 relates to a process of forming a color film layer 220.

For example, the color film layer 220 can include a plurality of color filter portions 222 and a plurality of black matrixes 221 arranged between or among the adjacent color filter portions 222, wherein the sectional shapes of the black matrixes 221 in the cross-sectional view can be inverse ladders. The color filter portions 222 can then be arranged such that they correspond to the display sub-pixels 111 of the array substrate 100.

Step S113 relates to a process of patterning the color film layer 220 so as to form concave portions at the side of the color film layer 220 that is opposite from the base substrate 210, for example, within the concave portions 2411 of the first dielectric layer.

In some embodiments, the patterning of the color film layer 220 includes the following step S1131 to step S1133.

Step S1131 relates to a process of forming photoresist at the side of the color film layer 220 that is opposite from the base substrate 210.

Step S1132 relates to a process of exposing the photoresist with a mask, for example, continuous gradient mask, and forming a first photoresist mask.

Step S1133 relates to a process of applying photolithography process to the color film layer with the first photoresist pattern as a mask and forming concave portions at the side of the color film layer 220 that is opposite from the base substrate 210.

Step S114 relates to a process of forming a lens material layer 242 at the side of the color film layer 220 that is opposite from the base substrate 210.

For example, the lens material layer 242 can be formed by inorganic material such as silicon dioxide (SiOx), silicon oxynitride (SiNxOy) or silicon nitride (SiNx) or organic material or other suitable material. Organic material can be material such as resin.

Step S115 relates to a process of patterning the lens material layer 242 to form the microlenses 230 located inside the concave portions.

For example, patterning processes similar to those in step S1131-step S1133 can be employed to patterning the lens material layer 242 to form the microlenses 230 located in the concave portions, it will not be repeated herein.

In the following, with reference to FIG. 10A, FIG. 10B, FIG. 10C, FIG. 10D, FIG. 10C, FIG. 10D, FIG. 10E and FIG. 10F, the manufacturing method of the display substrate 200 according to embodiments of the present disclosure, for example, the display substrate shown in FIG. 5A, will be described in detail. The manufacturing method of another display substrate 200 can then include the following steps S121-S126.

Step S121 relates to a process of providing a first dielectric layer 241.

For example, the first dielectric layer 241 can be the base substrate, the color film layer or other suitable dielectric layer.

Step S122 relates to a process of forming a photoresist 262 over the surface of the first dielectric layer 241.

Step S123 relates to a process of exposing the photoresist 262 with a mask 161, for example, continuous gradient mask, and forming a first photoresist pattern 263 after development.

For example, because the transmittances of different regions of the continuous gradient mask are different, the strength of the light entered different regions of the photoresist 262 are different, that is, the exposure amounts of different regions of the photoresist 262 are different, as a result, the thickness of the first photoresist pattern 263 formed after the development are different.

For example, the angle, i.e. the acute angle, θ of the sectional shapes of the microlenses 230 in the cross-sectional view can be adjusted through adjusting the thickness gradient of the first photoresist pattern 263, and the thickness h of the microlenses 230 in the third direction D3 can be adjusted through exposure amount. The angle θ of the sectional shapes of the microlenses 230 in the cross-sectional view and the thickness h of the microlenses 230 in the third direction D3 can be set according to at least one of a refractive index of the material of microlenses 230.

It will be understood that a refractive index of the first dielectric layer 241 or the refractive index of the liquid crystal layer can be customized in any suitable manner, and there are no limitations herein.

Step S124 relates to a process of applying photolithography process to a first dielectric layer 241 with the first photoresist pattern 263 as a mask and forming the concave portions 2411 at the surface of the first dielectric layer 241.

Step S125 relates to a process of forming a lens material layer 242 over the surface of the side of the first dielectric layer 241 where the concave portions 2411 are formed.

For example, the lens material layer 242 can be formed by inorganic material such as silicon dioxide (SiOx), silicon oxynitride (SiNxOy) or silicon nitride (SiNx) or organic material or other suitable material.

Step S126 relates to a process of forming a photoresist 262 at the side of the lens material layer 242 that is far away from the first dielectric layer 241.

Step S127 relates to a process of exposing the photoresist 262 over the lens material layer 242 with a mask 261 (for example, a continuous gradient mask) and forming a second photoresist 264 after the development.

For example, after exposing and developing the photoresist 262 over the lens material layer 242, at least a portion of the photoresist 262 corresponding to the regions where the microlenses 230 will be formed is remained, photoresist 262 corresponding to the remaining regions is removed.

Step S128 relates to a process of applying photolithography process to the lens material layer 242 with the second photoresist pattern 264 as a mask to form the microlenses 230 located in the concave portions.

Figure 10A:
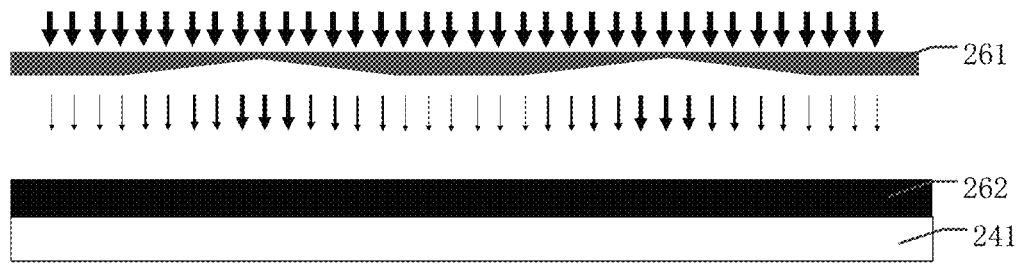
FIG. 10A illustrates a side cross-sectional view of a first sequential stage of manufacturing for creating another alternative display substrate in accordance with various alternative aspects of the present disclosure.
Figure 10B:
FIG. 10B illustrates a side cross-sectional view of a second sequential stage of manufacturing for creating the other alternative display substrate in accordance with various alternative aspects of the present disclosure.
Figure 10C:
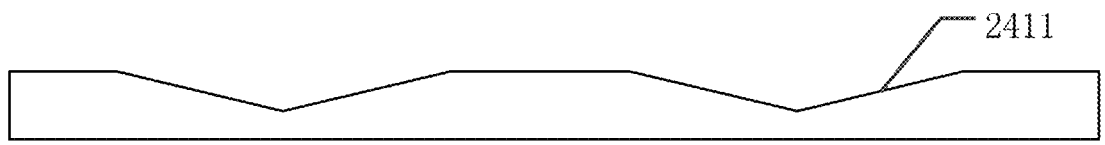
FIG. 10C illustrates a side cross-sectional view of a third sequential stage of manufacturing for creating the other alternative display substrate in accordance with various alternative aspects of the present disclosure.
Figure 10D:
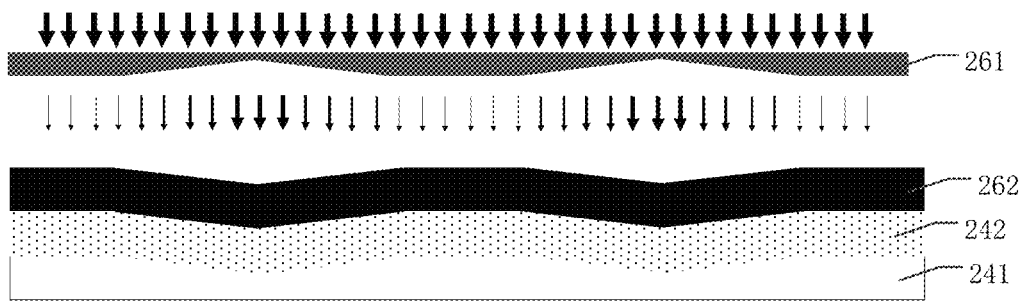
FIG. 10D illustrates a side cross-sectional view of a fourth sequential stage of manufacturing for creating the other alternative display substrate in accordance with various alternative aspects of the present disclosure.
Figure 10E:
FIG. 10E illustrates a side cross-sectional view of a fifth sequential stage of manufacturing for creating the other alternative display substrate in accordance with various alternative aspects of the present disclosure.
Figure 10F:
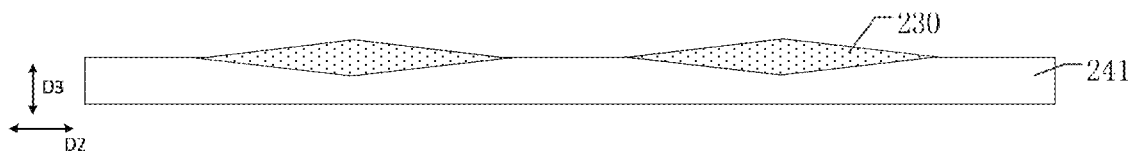
FIG. 10F illustrates a side cross-sectional view of a sixth sequential stage of manufacturing for creating the other alternative display substrate in accordance with various alternative aspects of the present disclosure.

As shown in FIG. 10F, in order to reduce optical distortion, the surfaces of the microlenses 230 that are in contact with the first dielectric layer 241 are parallel with the surface of the corresponding first dielectric layer.

In another aspect, a driving method of the display device according to embodiments of the present disclosure is provided, the driving method including the steps of: applying a pixel voltage to the pixel electrode of a display sub-pixel; in 2D display mode, applying same common voltage to a first common electrode and a second common electrode; and in 3D display mode, applying different common voltages to a first common electrode and a second common electrode.

For example, in the following, with reference to FIG. 11, the driving method of the display device 10 provided by at least one embodiment of the present disclosure is described in detail.

Figure 11:
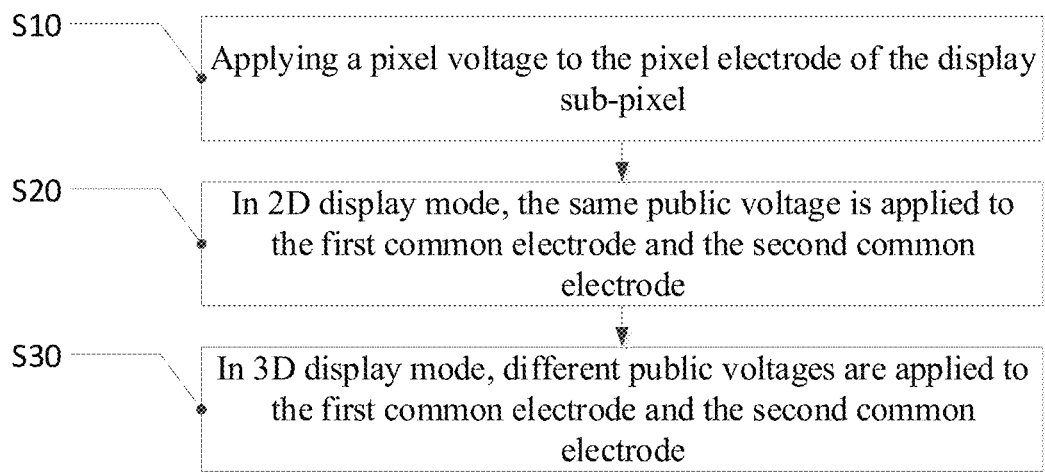
FIG. 11 illustrates a flow chart of a driving method associated with the various display devices as discussed herein according to some embodiments of the present disclosure.

As shown in FIG. 11, the driving method of the display device 10 includes the following step S10 to step S30.

Step S10 relates to a process of applying a pixel voltage to a pixel electrode 112 of a display sub-pixel 111.

Step S20 relates to a process of in 2D display mode, applying same common voltage to a first common electrode 113 and a second common electrode 114 of a display sub-pixel 111.

Step S30 relates to a process of in 3D display mode, applying different common voltages to a first common electrode 113 and a second common electrode 114 of a display sub-pixel 111.

For example, the driving method of the display device 10 shown in FIG. 11 can be applied to the display device 10 shown in FIG. 6 and FIG. 7, for the purpose of clear illustration, only the driving method of the display device 10 will be described, the specific structures of the display device 10 can refer to the embodiments shown in FIG. 6 and FIG. 7, it will not be repeated herein.

In some embodiments, as shown in FIG. 7, the display device 10 includes the first display regions corresponding to the first common electrodes 113 and the second display regions corresponding to the second common electrodes 114. For example, the microlenses 230 are configured to separate the light 152 emitted by the first display regions and the light 153 emitted by the second display regions, so that the first image 155 and the second image 156 that are separated in space can be formed within working distance of the display device 10. For example, the light 152 emitted by the first display regions is employed to form the image pixel of the first image 155, i.e. the left eye image, the light 153 emitted by the second display regions is employed to form the image pixel of the second image 156, i.e. the right eye image.

In some embodiments, when the first common voltage received by a first common electrode 113 and the second common voltage received by a second common electrode 114 are different, the strength of the light 152 emitted by the first display regions 161 and the strength of the light 153 emitted by the second display regions 162 are different, as a result, parallax exists between the first image 155 and the second image 156; in this case, a left eye and a right eye of a user respectively receive the first image 155 and the second image 156, the user can have stereoscopic perception, that is, the user can see an image 157 that has 3D visual effect, therefore, the display device 10 provided by embodiments of the present disclosure can achieve 3D display function without reducing resolution.

In some embodiments, when the first common voltage received by a first common electrode 113 and the second common voltage received by a second common electrode 114 are the same, the strength of the light 152 emitted by the first display regions 161 and the strength of the light 153 emitted by the second display regions 162 are the same, as a result, the first image 155 and the second image 156 are essentially the same; in this case, a left eye and a right eye of a user respectively receive the first image 155 and the second image 156, the user can see a 2D image. In addition, the resolution of the display device 10 in FIG. 7 is equal to M1×N1, wherein, M1 is the number of display pixels in the second direction D2, N1 is the number of display pixels in the first direction D1, that is, the display device 10 in FIG. 7 can realize 2D display function without reducing resolution.

In some embodiments, the device as described herein can include common electrodes and pixel electrodes which are located in different layers so as to form an advanced super dimensional switch (ADS). In the ADS mode, a multi-dimensional electric field is formed with both an electric field generated at edges of slit electrodes in a same plane and an electric field generated between a slit electrode layer and a plate-like electrode layer, so that liquid crystal molecules at all orientations, which are located directly above the electrodes or between the slit electrodes in a liquid crystal cell, can be rotated, In this way, the work efficiency of liquid crystal can be enhanced and the light transmittance can be increased. The ADS mode can improve the image quality of the thin film transistor liquid crystal display and has advantages of high resolution, high transmittance, low power consumption, wide viewing angle, high aperture ratio, low chromatic aberration, high response speed, free of push Mura, etc.

As contemplated herein each pixel electrode within the array substrate can thus be provided having an ADS configuration of the liquid crystal display comprises two layers of transparent electrodes, i.e. a first transparent electrode and a second transparent electrode disposed above the first transparent electrode.

One of the first transparent electrode and the second transparent electrode can then be used as a pixel electrode and connected to a drain electrode of a thin film transistor, wherein the other can used as a common electrode and connected to a common electrode line.

The second transparent electrode can then include a stripe electrodes having a certain width and separated from each other at a certain interval, so the second transparent electrode is also called a slit or channel electrode. The second transparent electrode and the first transparent electrode can then be arranged with one overlapping the other, and the first transparent electrode and the second transparent electrode can then be separated from each other with an insulating layer.

In some such embodiments, the array substrate can include various gate lines, data lines, and pixel units defined by or between the gate lines, wherein the gate lines and data lines intersect one another.

Further, the pixel unit can also include a pixel electrode and a thin film transistor. The pixel electrode can then include strip electrodes, and an opening which is provided between adjacent strip electrodes. The thin film transistor in such instances can include a gate electrode, a source electrode, and drain electrodes. In some such embodiments, the strip electrodes of each pixel electrode can all incline in one direction.

When the conventional liquid crystal display operates, liquid crystal deflects as driven by the electric field, and the liquid crystals in each pixel unit can be configured such that they only have one deflection angle. Due to anisotropy of the liquid crystal, the liquid crystal display can then have differences in brightness when it is viewed from different viewing angles, and associated chromatic aberration.

In some additional embodiments, the pixel unit can have a two-domain display region, i.e. wherein the display region of the pixel unit is a region covered by the pixel electrode except for the thin film transistor. In other words, the stripe electrodes in each pixel unit can instead have two inclination angles. In this case, when the liquid crystal display operates, the liquid crystal deflects as driven by the electric field, and the liquid crystal in each pixel unit can then be provided having two deflection angles.

Due to the averaging effect of deflection of the liquid crystal, differences in brightness of the liquid crystal display when the liquid crystal display is viewed from different viewing angles decrease, and chromatic aberration is improved in some degree.

Further, it is also contemplated herein that the pixel electrode and common electrode can be located in a common layer so as to form a fringe field switching mechanism (FFS).

Also contemplated herein is an arrangement wherein the pixels have multiple domain structures. In other words, each pixel, or each adjacent pixel, can be provided having different domain structures corresponding to different common electrodes.

The foregoing has provided a detailed description on an array substrate and manufacturing method thereof, a display device and driving method thereof and a manufacturing method of a display substrate according to some embodiments of the present disclosure. Specific examples are used herein to describe the principles and implementations of some embodiments. The description is only used to help understanding some of the possible methods and concepts. Meanwhile, those of ordinary skill in the art can change the specific implementation manners and the application scope according to the concepts of the present disclosure. The contents of this specification therefore should not be construed as limiting the disclosure.

In the foregoing method embodiments, for the sake of simplified descriptions, they are expressed as a series of action combinations. However, those of ordinary skill in the art will understand that the present disclosure is not limited by the described action sequence.

According to some other embodiments of the present disclosure, some steps can be performed in other orders, or simultaneously.

In addition, those of ordinary skill in the art will also understand that the embodiments described in the specification are just some of the embodiments, and the involved actions and portions are not necessarily all required to realize the functions of the various embodiments.

Various embodiments in this specification have been described in a progressive manner, where descriptions of some embodiments focus on the differences from other embodiments, and same or similar parts among the different embodiments are sometimes described together in only one embodiment.

It should also be noted that in the present disclosure, relational terms such as first and second, etc., are only used to distinguish one entity or operation from another entity or operation, and do not necessarily require or imply these entities having such an order or sequence. It does not necessarily require or imply that any such actual relationship or order exists between these entities or operations.

Moreover, the terms "include," "including," or any other variations thereof are intended to cover a non-exclusive inclusion such that a process, method, article, or apparatus that comprises a list of elements including not only those elements but also those that are not explicitly listed, or other elements that are inherent to such processes, methods, goods, or equipment.

In the case of no more limitation, the element defined by the sentence "includes a . . . " does not exclude the existence of another identical element in the process, the method, the commodity, or the device including the element.

In the descriptions, with respect to device(s), terminal(s), etc., in some occurrences singular forms are used, and in some other occurrences plural forms are used in the descriptions of various embodiments. It should be noted, however, that the single or plural forms are not limiting but rather are for illustrative purposes. Unless it is expressly stated that a single device, or terminal, etc. is employed, or it is expressly stated that a plurality of devices, or terminals, etc. are employed, the device(s), terminal(s), etc. can be singular, or plural.

Based on various embodiments of the present disclosure, the disclosed apparatuses, devices, and methods can be implemented in other manners. For example, the abovementioned terminals devices are only of illustrative purposes, and other types of terminals and devices can employ the methods disclosed herein.

Dividing the terminal or device into different "portions," "regions" "or "components" merely reflect various logical functions according to some embodiments, and actual implementations can have other divisions of "portions," "regions," or "components" realizing similar functions as described above, or without divisions. For example, multiple portions, regions, or components can be combined or can be integrated into another system. In addition, some features can be omitted, and some steps in the methods can be skipped.

Those of ordinary skill in the art will appreciate that the portions, or components, etc. in the devices provided by various embodiments described above can be configured in the one or more devices described above. They can also be located in one or multiple devices that is (are) different from the example embodiments described above or illustrated in the accompanying drawings. For example, the circuits, portions, or components, etc. in various embodiments described above can be integrated into one module or divided into several sub-modules.

The numbering of the various embodiments described above are only for the purpose of illustration, and do not represent preference of embodiments.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation to encompass such modifications and equivalent structures.

The invention claimed is:

1. An array substrate, comprising:
a base substrate; and
a plurality of display sub-pixels arranged in a matrix on the base substrate, wherein each individual display sub-pixel further comprise:
a pixel electrode;
a first common electrode; and
a second common electrode;
wherein the first common electrode and the second common electrode are insulated from each other; and
wherein the pixel electrode is configured to interact respectively with the first common electrode and the second common electrode so as to conduct one or more display operations;

wherein:
the first common electrodes of at least two adjacent display sub-pixels are electrically connected; and the second common electrodes of at least two adjacent display sub-pixels are electrically connected; and
the first common electrodes of at least two adjacent display sub-pixels are connected to a common block electrode, the first common block electrode extending in a first direction; and wherein the second common electrodes of at least two adjacent display sub-pixels are connected to a second common block electrode also extending in the first direction parallel to the first common block electrode;
the array substrate further comprising: a plurality of first common voltage lines and a plurality of second common voltage lines provided on the base substrate, the plurality of first common voltage lines and the plurality of second common voltage lines extending parallel to one another in a second direction, wherein, the first common electrodes of at least two adjacent display sub-pixels which extend in the first direction are electrically connected to a first common voltage line; and wherein the second common electrodes of at least two adjacent display sub-pixels which extend in the first direction are electrically connected to a second common voltage line, wherein the first direction and the second direction cross each other.

2. The array substrate according to claim 1, further comprising:
one or more common voltage terminals provided on the base substrate between two of the plurality of display sub-pixels;
wherein, the first common electrode and the second common electrode are configured to be connected to different common voltage terminals so as to receive a first common voltage and a second common voltage.

3. The array substrate according to claim 1, wherein, the first common electrode and the second common electrode are provided at a common height above the base substrate.

4. The array substrate of claim 1, wherein, the pixel electrodes, the first common electrodes and the second common electrodes are located on the base substrate, and wherein for each sub-pixel, the orthographic projection of the pixel electrode over the base substrate and the orthographic projections of the first common electrode and the second common electrode over the base substrate are overlapped; and wherein for each sub-pixel, the first common electrode and the second common electrode are tilted with respect to the base substrate such that first common electrode and the second common electrode face one another such that the overall shape of the first common electrode and the second common electrode is a first concave shape in relation to the base substrate.

5. The array substrate according to claim 4, wherein, the pixel electrodes are located between the first common electrodes and the base substrate; wherein each sub-pixel is formed having a second concave shape in relation to the base substrate; wherein the first concave shape and the second concave shape correspond in shape one to another.

6. A manufacturing method of the array substrate of claim 1, the method comprising:
providing a base substrate, and forming display sub-pixels over the base substrate, wherein forming the display sub-pixels comprises:
forming the first common electrodes and the second common electrodes over the base substrate, wherein, the first common electrodes and the second common electrodes are insulated from each other and are configured side by side over the base substrate; and
forming the pixel electrodes over the base substrate, wherein, the pixel electrodes are configured to allow them to interact respectively with the first common electrodes and the second common electrodes to conduct display operations.

7. The manufacturing method of the array substrate according to claim 6, wherein for each of the pixel electrodes, the first common electrodes and the second common electrodes over the base substrate, the orthographic projection of the pixel electrodes over the base substrate and the orthographic projections of the first common electrode and the second common electrode over the base substrate respectively overlap one another.

8. The manufacturing method of the array substrate according to claim 7, wherein in each sub-pixel, the first common electrode and the second common electrode are both tilted towards the base substrate from the side they face each other to the side they are adjacent to each other, as a result, the overall shape of the first common electrode and the second common electrode is a first concave shape in relation to the base substrate; and wherein in each sub-pixel, the pixel electrode is roughly in a second concave shape in relation to the base substrate; and wherein the first concave shape and the second concave shape correspond to one another.

9. A display device, comprising an array substrate including:
a base substrate; and
a plurality of display sub-pixels arranged in a matrix on the base substrate, wherein each individual display sub-pixel further comprise:
a pixel electrode;
a first common electrode; and
a second common electrode;
wherein the first common electrode and the second common electrode are insulated from each other; and
wherein the pixel electrode is configured to interact respectively with the first common electrode and the second common electrode so as to conduct one or more display operations;
wherein the display device further comprises a display substrate; and
wherein the display substrate and the array substrate are configured parallel to one another; and wherein the display substrate comprises a first substrate, the first substrate comprises a plurality of lenses corresponding to the one or more associated concave portions, at least one concave portion being associated with each of the display sub-pixels, wherein at least one lens is arranged inside each of the concave portions of the display substrate.

10. The display device according to claim 9, wherein, the first substrate further comprises a color film layer, the color film layer also including one or more associated concave portions, the color film layer extending into each of the concave portions of the display substrate.

11. A manufacturing method of the display device of claim 9, the method comprising:
providing a first substrate;
forming concave portions on an upper surface of the first substrate; and
forming a lens material layer over the concave portions and patterning the lens material layer to form the lenses that are located inside the concave portions.

12. The manufacturing method of the display device according to claim 11, wherein, the first substrate comprises a base substrate, the method further comprises:
   forming a first dielectric layer over the surface of the base substrate;
   forming concave portions in the first dielectric layer.

13. A driving method for utilizing of the display device according to claim 9, the driving method comprising:
   applying a pixel voltage to a pixel electrodes of a display sub-pixel;
   in 2D display mode, applying same common voltage to a first common electrode and a second common electrode of a display sub-pixel; and
   in 3D display mode, applying different common voltages to a first common electrode and a second common electrode of a display sub-pixel.

14. A display system, the display system comprising:
   an array substrate, the array substrate comprising:
      an array base substrate having an upper side and a lower side; and
      a plurality of display sub-pixels arranged in a matrix on the upper side of the array base substrate, wherein each individual display sub-pixel further comprises:
         a pixel electrode arranged above the array base substrate;
         a first common electrode being arranged above an upper side of the pixel electrode; and
         a second common electrode arranged above the pixel electrode adjacent the first common electrode;
         wherein the first common electrode and the second common electrode are insulated from each other; and
         wherein the pixel electrode is configured to interact respectively with both the first common electrode and the second common electrode so as to conduct one or more display operations; and
   a display substrate, the display substrate comprising:
      a display base substrate having an upper side and a lower side; and
      a color filter layer located above the display substrate; and
   wherein a first image pertaining to a right eye and a second image pertaining to a left eye are both projected from the array substrate through the display substrate; and
   the first common electrode and the second common electrode are provided at a common height above the array base substrate; and the array substrate further comprises:
      a plurality of display sub-pixels arranged in a matrix being grouped into a display pixel, wherein the array substrate comprises a plurality of display pixels also being arranged in the form of an array;
      wherein the first common electrodes of at least two adjacent display sub-pixels are electrically connected; and
      wherein the second common electrodes of at least two adjacent display sub-pixels are electrically connected;
      wherein, the first common electrodes of at least two adjacent display sub-pixels are connected to a common block electrode, the first common block electrode extending in a first direction; and wherein the second common electrodes of at least two adjacent display sub-pixels are connected to a second common block electrode also extending in the first direction parallel to the first common block electrode;
   the array substrate further comprises:
      a plurality of first common voltage lines provided on the array base substrate; and
      a plurality of second common voltage lines provided on the array base substrate;
      wherein the plurality of first common voltage lines and the plurality of second common voltage lines extend across the array base substrate parallel to one another in a second direction;
      wherein, the first common electrodes of at least two adjacent display sub-pixels are electrically connected to a first common voltage line; and
      wherein the second common electrodes of at least two adjacent display sub-pixels are electrically connected to a second common voltage line; and
      wherein the first direction and the second direction are perpendicular;
      wherein the pixel electrodes, the first common electrodes and the second common electrodes are located above the top surface of the array base substrate, and wherein for each sub-pixel, an orthographic projection of the pixel electrode over the array base substrate and a orthographic projection of each of the first common electrode and the second common electrode extend over the array base substrate in an overlapping fashion; and wherein for each sub-pixel, the first common electrode and the second common electrode are tilted with respect to the array base substrate such that first common electrode and the second common electrode face one another such that the overall shape of the first common electrode and the second common electrode is a first concave shape in relation to the array base substrate;
   wherein the pixel electrodes are located between the first common electrodes and the array base substrate; wherein each sub-pixel is formed having a second concave shape in relation to the array base substrate; and wherein the first concave shape and the second concave shape correspond in shape one to another.

15. The display system according to claim 14, further comprising:
   one or more common voltage terminals provided on the array base substrate between one or more rows of display sub-pixels;
   wherein, the first common electrode and the second common electrode are configured to be connected to different common voltage terminals so as to receive a first common voltage and a second common voltage.

* * * * *